United States Patent [19]

Tomlinson et al.

[11] Patent Number: 5,710,776
[45] Date of Patent: Jan. 20, 1998

[54] SIGNAL SELECTION AND FAULT DETECTION APPARATUS AND METHOD

[75] Inventors: Lloyd R. Tomlinson, Renton; Robert E. Freeman, Kent, both of Wash.

[73] Assignee: The Boeing Company, Seattle, Wash.

[21] Appl. No.: 441,680

[22] Filed: May 15, 1995

[51] Int. Cl.$^6$ .................................................. G06F 11/00
[52] U.S. Cl. .................................................. 371/5.1; 375/229
[58] Field of Search .................................. 371/5.1, 67.1, 371/48; 375/224, 229, 246; 364/554

[56] References Cited

U.S. PATENT DOCUMENTS

| | | | |
|---|---|---|---|
| 4,105,900 | 8/1978 | Martin et al. | 307/219 |
| 4,276,648 | 6/1981 | Tomlinson | 371/68 |
| 4,916,612 | 4/1990 | Chin et al. | 364/424.01 |
| 5,533,071 | 7/1996 | Krishnamurthy et al. | 375/346 |

*Primary Examiner*—Phung Chung
*Attorney, Agent, or Firm*—Seed and Berry LLP

[57] ABSTRACT

A signal selection and fault detection system receives multiple redundant sensor input signals that are processed through an equalizing and selecting network which outputs the midvalue signal. The system provides a variable fault monitoring threshold that provides the ability to detect for oscillatory faults among input signals that are less than 10% of static tracking tolerances for the inputs, while also assuring that nuisance fault detections are very improbable. The system provides a variable equalization rate that assures satisfactory blocking of oscillatory faults under dynamic conditions when signal disagreements are increased by gain tolerances between the input signals, and maintains high signal resolution of the output under such dynamic conditions. The system also provides cross-channel equalization of the selected midvalue signal in all operating channels to assure that all channels provide the same steady state output for only two input operation, while also maximizing fault blocking capability.

3 Claims, 29 Drawing Sheets

NOTES: (1) INITIALIZE OUTPUT STORAGE FOR RESTART TO FALSE AT STARTUP

| SIGNAL | TYPE | DESCRIPTION |
|---|---|---|
| EMINH | Boolean | External Monitor Inhibit |
| SL | Continuous | Left Input Signal |
| SC | Continuous | Center Input Signal |
| SR | Continuous | Right Input Signal |
| SVL | Boolean | Valid for Left Signal |
| SVC | Boolean | Valid for Center Signal |
| SVR | Boolean | Valid for Right Signal |
| SINL | Boolean | Inhibit for Left Signal |
| SINC | Boolean | Inhibit for Center Signal |
| SINR | Boolean | Inhibit for Right Signal |
| SO8T(2) | Continuous | Selected Outputs from other channels:<br>1 = SO8OTH1, 2 = SO8OTH2 |
| FOTH(2) | Boolean | Valids from other channels:<br>1 = FOTH1, 2 = FOTH2 |
| NVFC(3) | Continuous | Non-volatile fault counts:<br>1 = NVFCL, 2 = NVFCC, 3 = NVFCR |
| NVF(3) | Boolean | Non-volatile fault latches:<br>1 = NVFL, 2 = NVFC, 3 = NVFR |
| CNTR(3) | Boolean | Control Vector:<br>1 = Startup Trigger, SUTRIG<br>2 = Set BPL Latch, BPLSET<br>3 = Fault Count Consolidation Trigger |
| INCON(25) | Continuous | Constants used for signal groups<br>(e.g., Table 3.7.6.3-1) |
| IPV | Continuous | Integer Past Values |
| LPV | Boolean | Boolean (i.e., Logical) Past Values |
| MRL | Boolean | Maintenance Reset for Left Signal |
| MRC | Boolean | Maintenance Reset for Center Signal |
| MRR | Boolean | Maintenance Reset for Right Signal |
| FCT(3) | Continuous | Fault Counts:<br>1 = Left, 2 = Center, 3 = Right |
| ISL | Boolean | Isolate for Left Signal |
| ISC | Boolean | Isolate for Center Signal |
| ISR | Boolean | Isolate for Right Signal |
| FL | Boolean | Fault Latch for Left Signal |
| FC | Boolean | Fault Latch for Center Signal |
| FR | Boolean | Fault Latch for Right Signal |
| FA(3) | Boolean | Fault Active:<br>1 = Left, 2 = Center, 3 = Right |
| F2(2) | Boolean | Discrete Vector:<br>1 = second fault with both inputs valid, SF2BV:<br>2 = Two Signal Isolated discrete, I2ND |
| SO | Continuous | Selected Output |
| OSV | Boolean | Output Signal Valid |
| AVLC | Boolean | Avalanche condition |
| SF2BV | Boolean | Set Second Fault with Both Inputs Valid |

*Fig. 22*

TABLE 3.7.2.4-1
NOMENCLATURE FOR SSFD, DSFD AND SSFI

| NAME | TYPE | DESCRIPTION (UNITS FOR PARAMETERS) |
|---|---|---|
| ADTEi | CONTINUOUS | Absolute Value of DTEi for signal i |
| ADTEiP (i - L,C,R) | CONTINUOUS | Previous Absolute Value of DTEi for signal i |
| AL2V | BOOLEAN | At least 2 valid inputs |
| AL2VNVi (i - L,C,R) | BOOLEAN | At least 2 valid inputs OR not valid input i |
| AVICNT | CONTINUOUS | Additional valid input frame count |
| AVIDL | CONSTANT | Additional valid input delay (cycles) |
| AVLC | BOOLEAN | Avalanche condition discrete |
| BLKEO | BOOLEAN | Block Equalization |
| BPL | BOOLEAN | Bypass latch |
| BPLSET | BOOLEAN | Set BPL discrete |
| CFRPI | CONSTANT | Comparison Fault Reset Prohibit Increment (Integer) |
| CVLEA | CONTINUOUS | Calculated VLEA |
| DEC | CONSTANT | Out-of-threshold integrator decrement (LSB16 for SSFD, Integer for DSFD) |
| DEMINHi (i - L,C,R) | BOOLEAN | External monitor inhibit for signal i for the DSFD |
| DFi (i - L,C,R) | BOOLEAN | Fault indication for signal i for the DSFD |
| DFiP (i - L,C,R) | BOOLEAN | Previous value for DFi for signal i for the DSFD |
| DFLi (i - L,C,R) | BOOLEAN | Fault latch for signal i for the DSFD |
| DFLiP (i - L,C,R) | BOOLEAN | Previous value of DFLi for signal i for the DSFD |
| DFRi (i - L,C,R) | BOOLEAN | Fault reset for signal i for the DSFD |
| DFRiP (i - L,C,R) | BOOLEAN | Previous value of DFRi for signal i for the DSFD |
| DFSSO | CONTINUOUS | Default Signal Selector Output |
| Di (i - L,C,R) | BOOLEAN | Discrete signal i for the DSFD |
| DINi (i - L,C,R) | BOOLEAN | Inhibit for signal i for the DSFD |
| DIi (i - L,C,R) | BOOLEAN | Discrete Isolate for input i to DSFD |

Fig. 23A

TABLE 3.7.2.4-1
NOMENCLATURE FOR SSFD, DSFD AND SSFI (CONTINUED)

| NAME | TYPE | DESCRIPTION (UNITS FOR PARAMETERS) |
|---|---|---|
| DO | BOOLEAN | Discrete output from DSFD |
| DOV | BOOLEAN | Discrete output valid |
| DOVS | BOOLEAN | Switched discrete output valid for the DSFD |
| DTEi (i - L,C,R) | CONTINUOUS | Dynamic tracking error for signal i |
| DTINVi (i - L,C,R) | BOOLEAN | Total invalid for signal i for the DSFD |
| DTOCNT | CONTINUOUS | Discrete timeout counter |
| DTTT | CONTINUOUS | Dynamic component of tracking tolerance threshold |
| DTTTLM | CONSTANT | Limit value for DTTT (LSB16) |
| DVi (i - L,C,R) | BOOLEAN | Valid for signal i for the DSFD |
| | | |
| Ei (i - L,C,R) | CONTINUOUS | Equalization for signal i |
| EFEQi (i - L,C,R) | BOOLEAN | Enable fast equalization for signal i |
| EIMRi | BOOLEAN | Extended Interval MRi |
| EMINH | BOOLEAN | External monitor inhibit |
| EMINHi (i - L,C,R) | BOOLEAN | External monitor inhibit for signal i |
| EQSi (i - L,C,R) | CONTINUOUS | Equalized signal i |
| ETEi (i - L,C,R) | CONTINUOUS | Equalization dynamic tracking error for signal i |
| | | |
| Fi (i - L,C,R) | BOOLEAN | Fault latch for signal i |
| FAi (i - L,C,R) | BOOLEAN | Fault active for signal i |
| FCCT | BOOLEAN | Fault count consolidation trigger |
| FCNTEN | CONSTANT | Fault count enable switch position for SSFD |
| FCNTENBL | CONSTANT | Fault count enable switch position for DSFD |
| FCRP | CONSTANT | Fault count reset prohibit (Integer) |
| FCTi (i - L,C,R) | CONTINUOUS | Fault count for signal i |
| FICi (i - L,C,R) | CONTINUOUS | Fault integration count for signal i for the DSFD |
| FLi (i - L,C,R) | BOOLEAN | Fault latch one-shot for signal i for the DSFD |

*Fig. 23B*

TABLE 3.7.2.4-1
NOMENCLATURE FOR SSFD, DSFD AND SSFI (CONTINUED)

| NAME | TYPE | DESCRIPTION (UNITS FOR PARAMETERS) |
|---|---|---|
| FMONDi (i - L,C,R) | BOOLEAN | Fault monitoring disable for signal i |
| FOTH1 | BOOLEAN | Other channel one fault discrete |
| FOTH2 | BOOLEAN | Other channel two fault discrete |
| FRMCHGLM | CONSTANT | Frame change limit for KITT input (LSB16) |
| FSO | CONTINUOUS | Filtered selected output |
| GLER | CONTINUOUS | Gain used to calculate equalization rate limit (Integer) |
| I2ND | BOOLEAN | Two signals isolated discrete |
| I2NDPNP | BOOLEAN | Past value of the negation of I2ND |
| I3RDN | BOOLEAN | Three signals isolated discrete |
| IALL | BOOLEAN | Isolate all inputs for DSFD |
| IALLN | BOOLEAN | Negation of IALL |
| ICFICi (i - L,C,R) | CONTINUOUS | Fault monitor initial condition for signal i |
| ICOTIi (i - L,C,R) | CONTINUOUS | Initial condition of out-of-threshold integrator for signal i |
| INC | CONSTANT | Count up Integrator for DSFD monitor (Integer) |
| INHSSi (i - L,C,R) | BOOLEAN | Inhibit signal selection for signal i |
| INT1 | CONTINUOUS | Threshold decay integrator in the variable threshold calculation |
| INT2 | CONTINUOUS | Signal magnitude integrator in the variable threshold calculation |
| IRDLY | CONSTANT | Isolate reset delay (Cycles) |
| ISi (i - L,C,R) | BOOLEAN | Isolate signal i |
| ITL | CONSTANT | Integration trip level (LSB16 for SSFD, Integer for DSFD) |
| ITLPRSI | CONSTANT | ITL plus a reset increment (Integer) |
| IVFW | CONSTANT | Invalid fault weighting (LSB16) |
| IVINC | CONSTANT | Invalid increment for DSFD monitor (Integer) |
| KITT | CONSTANT | Gain for varying DTTT with signal rate (Integer) |

Fig. 23C

TABLE 3.7.2.4-1
NOMENCLATURE FOR SSFD, DSFD AND SSFI (CONTINUED)

| NAME | TYPE | DESCRIPTION (UNITS FOR PARAMETERS) |
|---|---|---|
| K2BO | CONSTANT | Gain for decay of rate of DTTT (Integer) |
| K2TT | CONSTANT | Gain for varying DTTT with signal magnitude (Integer) |
| KFI | CONSTANT | Gain relating threshold exceedances to fault count increment (Integer) |
| KTO | CONSTANT | Startup timeout counter limit (Integer) |
| KVLEA | CONSTANT | Variable limit equalization authority gain (Integer) |
| LEA | CONSTANT | Equalization authority limit (LSB16) |
| LER | CONSTANT | Equalization rate limit (LSB16) |
| LFI (i - L,C,R) | BOOLEAN | Latched fault for signal i |
| LFIP (i - L,C,R) | BOOLEAN | Previous value of latched fault for signal i |
| LSA | BOOLEAN | Low signal activity discrete |
| LSATH | CONSTANT | Low signal activity threshold (LSB16) |
| LSE | CONSTANT | Limit static equalization (LSB16) |
| LSEL | CONSTANT | LSE for left input to SSFI (LSB16) |
| LSEC | CONSTANT | LSE for center input to SSFI (LSB16) |
| LXCE | CONSTANT | Cross-channel equalization rate limit (LSB16) |
| LXCER | CONSTANT | Limit cross-channel equalization rate (LXCE/RFR) (LSB16) |
| MAXINC | CONSTANT | Maximum that OTI can be incremented in one frame (LSB16) |
| MODE | CONSTANT | Discrete majority voter past value switch position |
| MRi (i - L,C,R) | BOOLEAN | Maintenance reset for input signal i |
| MXINC32DKFI | CONSTANT | MAXINC divided by KFI/32 (Scaling) |
| NFRCNTi (i - L,C,R) | CONSTANT | Frame counts for disabling fault monitoring for signal i |
| NOMTH | CONSTANT | Defines DTTT when set to a number greater than zero (LSB16) |
| NOMVAL | CONSTANT | Nominal value for use in place of last value for isolated input (LSB16) |
| NVFCi (i - L,C,R) | CONTINUOUS | Non-volatile fault count for signal i |

Fig. 23D

TABLE 3.7.2.4-1
NOMENCLATURE FOR SSFD, DSFD AND SSFI (CONTINUED)

| NAME | TYPE | DESCRIPTION (UNITS FOR PARAMETERS) |
|---|---|---|
| NVFi (i - L,C,R,) | BOOLEAN | Non-volatile fault latch for signal i |
| OISDi (i - L,C,R) | BOOLEAN | Tracking tolerance threshold exceeded discrete for signal i |
| OISDiP (i - L,C,R) | BOOLEAN | Previous value of OISD for signal i |
| OSV | BOOLEAN | Output signal valid |
| OTIi (i - L,C,R) | CONTINUOUS | Out-of-threshold integrator for signal i |
| PVBIAS | CONSTANT | Bias applied to past value of selected output (LSB16) |
| PVMD | CONSTANT | Past value mode switch position |
| RESTART | BOOLEAN | Restart discrete |
| RESET START | BOOLEAN | Reset for Start state latch |
| RFR | CONSTANT | Ratio of frame rates (Integer) |
| RSI | CONSTANT | Reset increment (Integer for DSFD) |
| RSTSWi (i - L,C,R) | BOOLEAN | Reset fault latch discrete for signal i |
| RSTSWiP (i - L,C,R) | BOOLEAN | Previous value of RSTSW for signal i |
| Si (i - L,C,R) | CONTINUOUS | Input signal i |
| SEQXC | BOOLEAN | Cross-channel equalization execution discrete |
| SF2BV | BOOLEAN | Set pulse which occurs with fault 2 and both inputs valid |
| SWF2BV | BOOLEAN | Switched F28V for DSFD |
| SIE | CONSTANT | Single input enable (Boolean) |
| SINi (i - L,C,R) | BOOLEAN | Signal Inhibit for signal i |
| SO | CONTINUOUS | Selected output signal |
| SO8OTH1 | CONTINUOUS | Selected output for other channel 1 sampled every 8 frames |
| SO8OTH2 | CONTINUOUS | Selected output for other channel 2 sampled every 8 frames |
| SO8P | CONTINUOUS | Previous state of SO used in cross-channel equalization |

Fig. 23E

TABLE 3.7.2.4-1
NOMENCLATURE FOR SSFD, DSFD AND SSFI (CONTINUED)

| NAME | TYPE | DESCRIPTION (UNITS FOR PARAMETERS) |
|---|---|---|
| SOP | CONTINUOUS | Previous selected output |
| SOTi (i - L,C,R) | BOOLEAN | Fault latch pulse that sets OTi to ITLPRSi for signal i |
| SSFDTRIG | BOOLEAN | Initialization trigger |
| START | BOOLEAN | Startup active discrete |
| STNSIE | CONSTANT | Startup timeout and no single input valid discrete |
| SULER | CONSTANT | Startup value for LER (LSB16) |
| SUP | BOOLEAN | Startup active discrete |
| SUPOCNT | CONTINUOUS | Startup phase out count |
| SUPODL | CONSTANT | Startup phase out delay (Cycles) |
| SUTRIG | BOOLEAN | Startup trigger |
| SVi (i - L,C,R) | BOOLEAN | Signal valid for signal i |
| SViN (i - L,C,R) | BOOLEAN | SVi Not |
| TOUT | BOOLEAN | Timeout discrete |
| TTTO | CONSTANT | Constant portion of DTTT (LSB16) |
| VLEA | CONTINUOUS | Variable limit equalization authority for drift correction |
| VLER | CONTINUOUS | Variable limit equalization rate |
| VLXE | CONTINUOUS | Variable limit cross-channel equalization |
| XCENABLE | BOOLEAN | Cross-channel equalization enable flag |
| XCEQCNT | CONTINUOUS | Cross-channel equalization sequencer count |
| XCEQ80 | CONTINUOUS | Cross-channel equalization signal calculated at 8 frames (max time) |

*Fig. 23F*

SIGNAL SELECTION AND FAULT DETECTION APPARATUS AND METHOD

TECHNICAL FIELD

This invention pertains to the electrical signal processing art and, more particularly, to signal selection and fault detection processing.

BACKGROUND OF THE INVENTION

Redundant channel signal processing is well known to the prior art. A particular example is the aviation art, wherein several sensors, each sensing the same airplane parameter, provide corresponding output signals. Processing circuitry receives the redundant signals, and includes a means to select that signal, or a combination of signals, which is most likely to be representative of the actual airplane parameter.

In one prior art approach to redundant signal processing, the signal output by a processing network is that signal having a midvalue between the other input signals. Equalization of all signals, to eliminate null offsets among the various sensors, is accomplished through a first order lag circuit. Signal monitoring detects a fault on a channel and, upon detection of such fault, substitutes a zero for the failed input signal.

This approach suffered numerous deficiencies. First, lag circuit equalization did not completely eliminate failure transients. Second, the output incurs a dead zone about zero after isolation of a first failure. This dead zone resulted from the fact that, for substantial time periods, the zero substituted signal is the midvalue signal, with this midvalue zero signal being outputted as representative of the parameter being monitored. Finally, fault monitoring in this system is less than optimum.

In a second approach, an output is produced which is the average of the inputs. A defect of this approach is that it depends heavily on the signal monitoring to protect against failure transients. Large control error transients can occur before faults are detected and isolated. Complex schemes are devised to take questionable signals out of the averaging process as soon as monitoring thresholds are exceeded, and then monitoring a time delay to determine if the signal should be locked out permanently or returned to the averaging process. Lag equalization is sometimes provided to allow using smaller monitoring thresholds, but the lag equalization in combination with the average selection has the deficiency of allowing slow over faults to cause large errors in the output before the fault can be detected.

In a third prior art approach, the output is selected as a master channel with monitoring causing the system to switch to an alternate channel if the master channel fails. This process is limited in that the monitoring cannot provide 100% protection against first faults. Further, in requiring that a master channel exist, selection and control cannot be identical on all three channels.

In a fourth approach, the output is selected as the midvalue of inputs and integral equalization is used to completely eliminate static offsets between the signals. However, a defect in this system has been that the equalizing integrators can drift, allowing the output signal to go beyond boundaries defined by the nonfailed input signals. This results in an output signal which is not truly representative of the parameter being sensed.

In a final approach, described in U.S. Pat. No. 4,276,648, a signal selector apparatus selects one of several input signals. The apparatus includes a midvalue selector which has a plurality of inputs and an output. The midvalue selector passes that input signal having a value between the other input signals to its output. An equalizer processes each input signal and eliminates null offsets contained therein. The equalizer further includes a means which intercouples the midvalue selector and the equalizer such that the signal produced at the midvalue selector output is the midvalue of one of the input equalized signals, bounded by those input signals having values above and below the midvalue.

Preferably, the equalizer includes an equalizing channel for each input signal. Each equalizing channel includes an integrator, a combiner and a second midvalue selector. The combiner combines the signal at the input of the equalizing channel with the output of the midvalue selector and passes the resultant signal to the input of the integrator. The second midvalue selector receives the outputs from all of the equalizing channel integrators and passes that signal having a value between the other signals to its output. The passed output from the midvalue selector is coupled to the input of the integrator.

This final approach was successful in meeting the requirements for autopilot input signal processing, but it did not meet stringent performance necessary for processing primary flight control signals of advanced aircraft such as the Boeing 777 Airplane. The Boeing 777 Airplane employs multiple primary flight controllers ("PFC") to automate essentially all parameters of the airplane. The PFC's essentially require an order of magnitude lower detection and protection from faulty signals in the various redundant signals (which are placed onto a bus interconnecting systems in the airplane).

Prior autopilot applications did not have stringent requirements for oscillatory fault protection because the autopilot could be manually disconnected if an unacceptable oscillation developed. Oscillatory faults could possibly overexcite structural modes of the aircraft, possibly for the remainder of a flight. While the PFC's of the 777 Airplane can be manually disconnected, the airplane suffers from worse performance, and the disconnections may not isolate the oscillatory fault. Therefore, a stringent fault blocking and fault detection system is necessary to assure continued safe flight and landing of the airplane after a fault has occurred.

All sensing systems on the airplane have certain defined static tracking tolerances. Prior approaches in fault detection detected faults outside of normal dynamic tracking tolerances. However, at times, gain tolerances can be larger than allowable oscillatory fault levels for certain signals for the PFC. If prior art methods attempted to detect faults below the static tracking tolerances, nuisance faults often occurred incorrectly indicating that a fault existed. However, this detected "fault" was often acceptable for tolerances of the system that generated the signal, which was incorrectly detected as a fault.

Additionally, the Boeing 777 Airplane employs multiple redundant PFCs, and therefore requires cross-channel tracking of signals from various redundant signal selection fault detection circuits employed by the PFCs. The PFCs require cross-channel equalized signals from the signal selection and fault detection processes to assure tracking between redundant channels. Such a cross-channel equalization is particularly difficult with asynchronous operation of the PFC's channels.

SUMMARY OF THE INVENTION

The present invention provides a signal selection and fault detection ("SSFD") processing system for safety critical control requirements where two or more redundant elements are provided for each sensing, measuring or computing requirement in order to assure continued safe operation after failure of one or more of the control elements. The SSFD takes two to three redundant input signals that are necessary to meet the availability and integrity requirements for the input data and processes them to provide a selected output that is suitable for control purposes and that agrees across all redundant control channels. The SSFD system under the present invention is generally described for use with three input signals that continues operation with two input signals after detection of the first fault, and then further continues with the last remaining input if the second fault can be identified to a specific signal. However, the concepts developed are equally applicable to an SSFD process that would start out with four inputs to provide additional availability and integrity.

The present invention provides a variable fault monitoring threshold that provides the ability to detect oscillatory faults that are less than 10% of the static tracking tolerances of the input signals, while also assuring that nuisance fault detections are very improbable. The present invention provides a variable equalization rate that assures: (1) satisfactory blocking of oscillatory faults from the SSFD output even under dynamic conditions where signal disagreements are increased by gain tolerances between the input signals, and (2) maintaining high signal resolution of the SSFD output under dynamic conditions when the input signals have both null offsets and large gain tolerances. The present invention also provides cross-channel equalization of the SSFD selected output signal to assure that asynchronous channels provide the same steady state output for two input operation of the SSFD while also maximizing fault blocking capability.

The present invention also provides the following additional features. First, the present invention define a common algorithm that may be used for all applicable processing requirements, thus minimizing efforts to validate a different algorithm for each variation in application requirements. Second, the present invention preferably employs signal validity flags from signals generated by various transducers or components (such as line replacable units LRUs on an aircraft) that may allow the present invention to isolate one of two working input signals and thus allow continuing operation on the last valid input signal. Third, the present invention preferably employs signal inhibit flags from data bus monitoring to isolate data bus faults and prevent data bus faults from latching faults against source sensors, thus optimizing the fault identification capability.

Fourth, the present invention preferably employs an external monitor inhibit input signal that can be used to block monitoring of input signals, but leaves signal selection active for use when signals are in a state not suitable for monitoring. The external monitor inhibit signals have been found useful for aircraft sensor signals such as radio altitude signals when roll attitude becomes large, for control column and control wheel force signals when force sensors hit mechanical limits, and for lateral gust delta pressure sensing when flow separation occurs.

Fifth, the present invention preferably continues equalization and monitoring of failed input signals to allow a limited number of latched faults to clear if behavior of the input signal returns to normal. This feature can drastically reduce costly maintenance caused by unfailed LRUs being cycled through the repair shop.

Sixth, the present invention preferably employs fast equalization at start-up and when recovering from a signal inhibit so signals come back on line rapidly and without nuisance faults. Seventh, the present invention preferably employs maintenance resets to clear fault latches after repairs are verified by a maintenance test. Eighth, the present invention preferably employs a by-pass latching BPL input that blocks fault counting and fault latching, but leaves fault detection and annunciation active when the airplane is in an on-ground state when faults can be induced by airplane shutdown procedures or by maintenance actions.

Other features and associated advantages of the present invention will become apparent from studying the following detailed description, together with the accompanying drawings.

BRIEF DESCRIPTION OF THE DRAWINGS

FIG. 22 is a table of the input and output signals of FIG. 21, with the corresponding values and definitions.

FIGS. 23A, 23B, 23C, 23D, 23E, and 23F are tables of the signals shown in FIGS. 1 through 20, and the corresponding type and description of the signal.

DETAILED DESCRIPTION OF THE INVENTION

The present invention is generally described herein in terms of logic circuits. An alternate preferred embodiment of the present invention, however, is implemented as a software routine that runs on a computer system, such as the primary flight controllers or other suitable computers having at least a microprocessor and memory. The detailed description of the present invention provided herein, which is provided in terms of circuits, will enable one skilled in the art to construct a software implementation of the invention.

Figure 1:
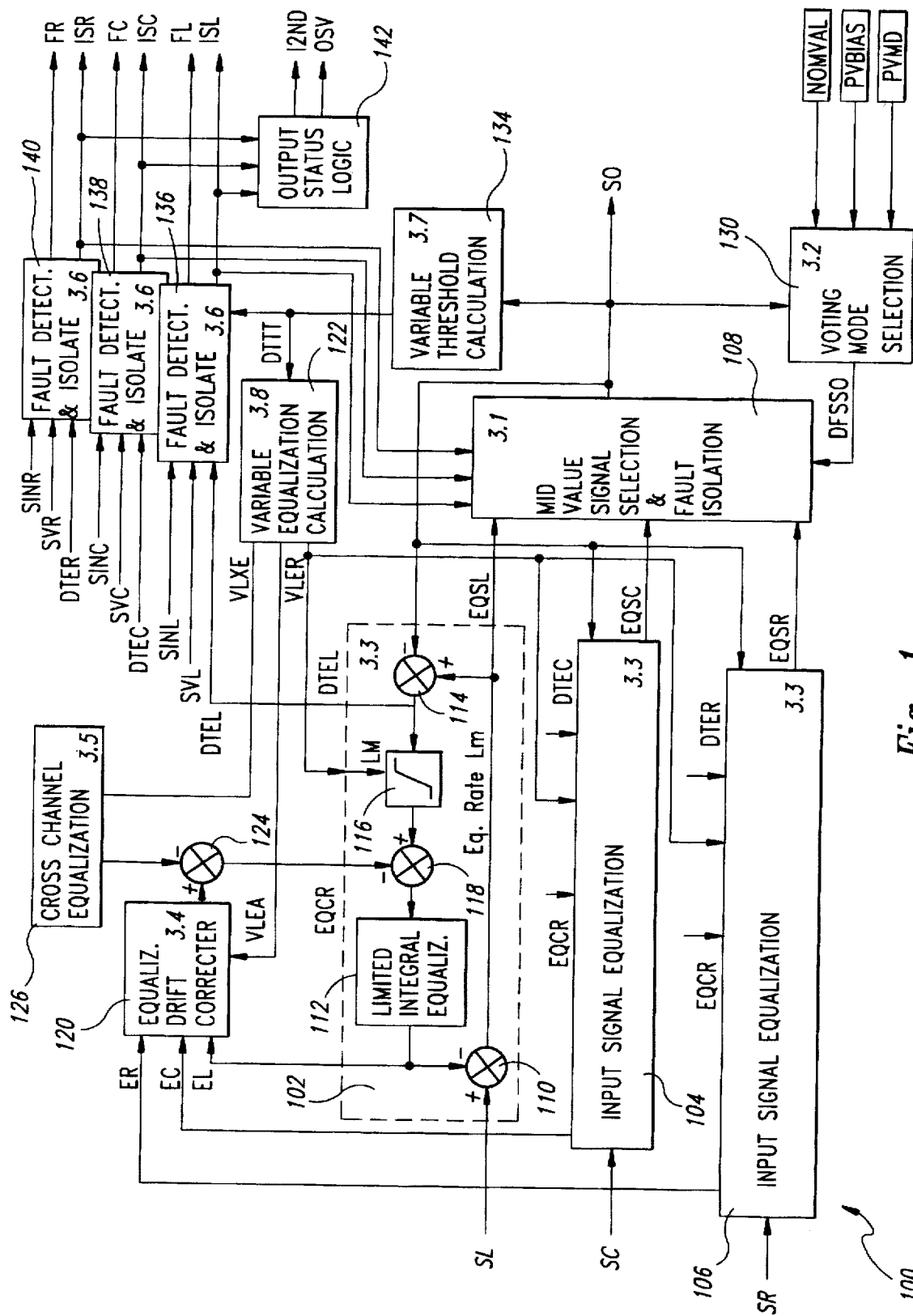
FIG. 1 is a high level block diagram of the signal selection and fault detection system of the present invention.

Referring to FIG. 1, a signal selection and fault detection ("SSFD") system 100 has three redundant input signal equalization circuits or blocks 102, 104 and 106 that receive left, center and right input signals SL, SC, and SR, all respectively. As used generally herein, the letters "L," "C," and "R" in various acronyms for signals are acronyms for left, center and right, respectively. As noted above, the present invention is preferably employed in redundant channel signal processing having left, center and right channels.

The left input signal equalization block 102 shows the basic components of each input signal equalization block, and the left, center and right input signal equalization blocks 102, 104 and 106, respectively, operate identically. Therefore, only the left input signal equalization block 102 will be discussed. Those skilled in the art will recognize that the same discussion applies to the center and right input signal equalization blocks 104 and 106.

The left input signal equalization block 102 outputs an equalized signal EQSL to a midvalue signal selection and fault isolation block 108. The midvalue signal selection and fault isolation block 108 selects one of the signals EQSL, EQSC, and EQSR to be output as a selected output signal SO, as described below.

The left input signal equalization block 102 includes an adder 110 that adds a negative value (or subtracts) an equalization signal EL, produced by a limited integral equalization block 112, to the left input signal SL to produce the left equalized signal EQSL. The equalized signal EQSL is input to an adder 114 that subtracts the selected output signal SO therefrom to produce a left dynamic tracking error signal DTEL for the left input signal equalization block 102.

An equalization rate limiter 116 receives the left dynamic tracking equalization signal DTEL and limits it to within a range defined by a variable limit equalization rate VLER and outputs an equalization rate limited signal to an adder 118. The adder 118 subtracts therefrom a cross-channel equalization signal EQCR to produce a cross-channel equalized signal that is input to the limited integral equalizer 112. The limited integral equalizer 112 outputs the left equalization signal EL, which is input to both the adder 110 and to an equalization drift corrector 120.

The equalization drift corrector 120 also receives a variable limit equalization authority for drift correction signal VLEA from a variable equalization calculation block 122, and receives the equalization signals ER and EC from the right and center channels, which are output from the right and center input signal equalization blocks 106 and 104, respectively. The equalization drift corrector 120 outputs a signal that is added in an adder 124 to a cross-channel equalization signal produced by a cross-channel equalization block 126, to produce the cross-channel equalization signal EQCR. The left center and right input signal equalization blocks 102, 104 and 106, the midvalue signal selection and fault isolation block 108, the equalization drift corrector 120 and the adder 124 are generally described in more detail below with respect to FIGS. 6 and 8.

The midvalue signal selection and fault isolation block 108 selects the left, center or right equalized signal EQSL, EQSC, or EQSR, from the respective left, center and right input signal equalization blocks 102, 104 and 106, to become the selected output signal SO. If less than all three equalized signals are valid, then block 108 selects the output signal SO based on a default signal selector output signal DFSSO output from a voting mode selection block 130. The voting mode selection block 130 receives the selected output signal SO and generates the default signal selector output signal DFSSO based on one of three signals: (1) a past value mode switch position signal PVMD, (2) a nominal value for use in place of the past value for isolated inputs NOMVAL, or (3) a bias applied to the past value PVBIAS that is applied to the selected output signal SO. The voting mode selection block 130 is described in more detail below generally with respect to FIG. 6.

A variable threshold calculation block 134 receives the selected output signal SO and produces a dynamic component of a tracking tolerance threshold DTTT. The dynamic tracking tolerance threshold DTTT is input to the variable equalization calculation block 122 and left, center and right fault detection and isolation blocks 136, 138 and 140, respectively. The variable threshold calculation block 134 is generally described in more detail below with respect to FIG. 11.

The variable equalization calculation block 122, which receives the dynamic tracking tolerance threshold signal DTTT, outputs in response thereto the variable limit equalization authority for drift correction signal VLEA to the equalization drift corrector 120, and the variable limit equalization rate signal VLER to the equalization rate limiter 116 in each of the left, center and right input signal equalization blocks 102, 104 and 106. The variable equalization calculation block 122 also outputs a variable limit cross-channel equalization signal VLXE to the cross-channel equalization block 126. The variable equalization calculation block 122 is generally described in more detail below with respect to FIG. 9. The cross-channel equalization block 126 is generally described below with respect to FIGS. 8A and 8B.

The left fault detection and isolation block 136 receives the left dynamic tracking error signal DTEL, which is output from the adder 114 of the left input signal equalization block 102. The left fault detection and isolation block 136 also receives a left signal inhibit signal SINL and a left signal valid signal SVL. In response to input signals, the left fault detection and isolation block 136 detects and isolates faults in the left channel to produce a left isolate signal ISL that is input to the midvalue signal selection and fault isolation block 108 to isolate the erroneous channel in the event of detection of a fault. The left fault detection and isolation block 136 also outputs a left fault latch signal FL.

The center and right fault detection and isolation blocks 138 and 140 similarly receive the dynamic tracking tolerance threshold DTTT and respective center and right dynamic tracking error signals DTEC and DTER, signal inhibit signals SINC and SINR and signal valid signals SVC and SVR. In response thereto, the center and right fault detection and isolation circuits 138 and 140 similarly output center and right isolation signals and fault latch signals ISC and FC, and ISR and FR, respectively. The fault detection and isolation blocks 136, 138, 140 are generally described in more detail below with respect to FIGS. 10 and 14.

The left, center and right isolate signals ISL, ISC and ISR are input to an output status logic block 142. In response thereto, the output status logic block 142 produces an output signal valid signal OSV meaning all inputs have not been isolated. If two signals are isolated, then the output status logic block 142 outputs a two signals isolated signal I2ND. The output status logic block 142 is generally described in more detail below with respect to FIG. 16.

Figure 2:
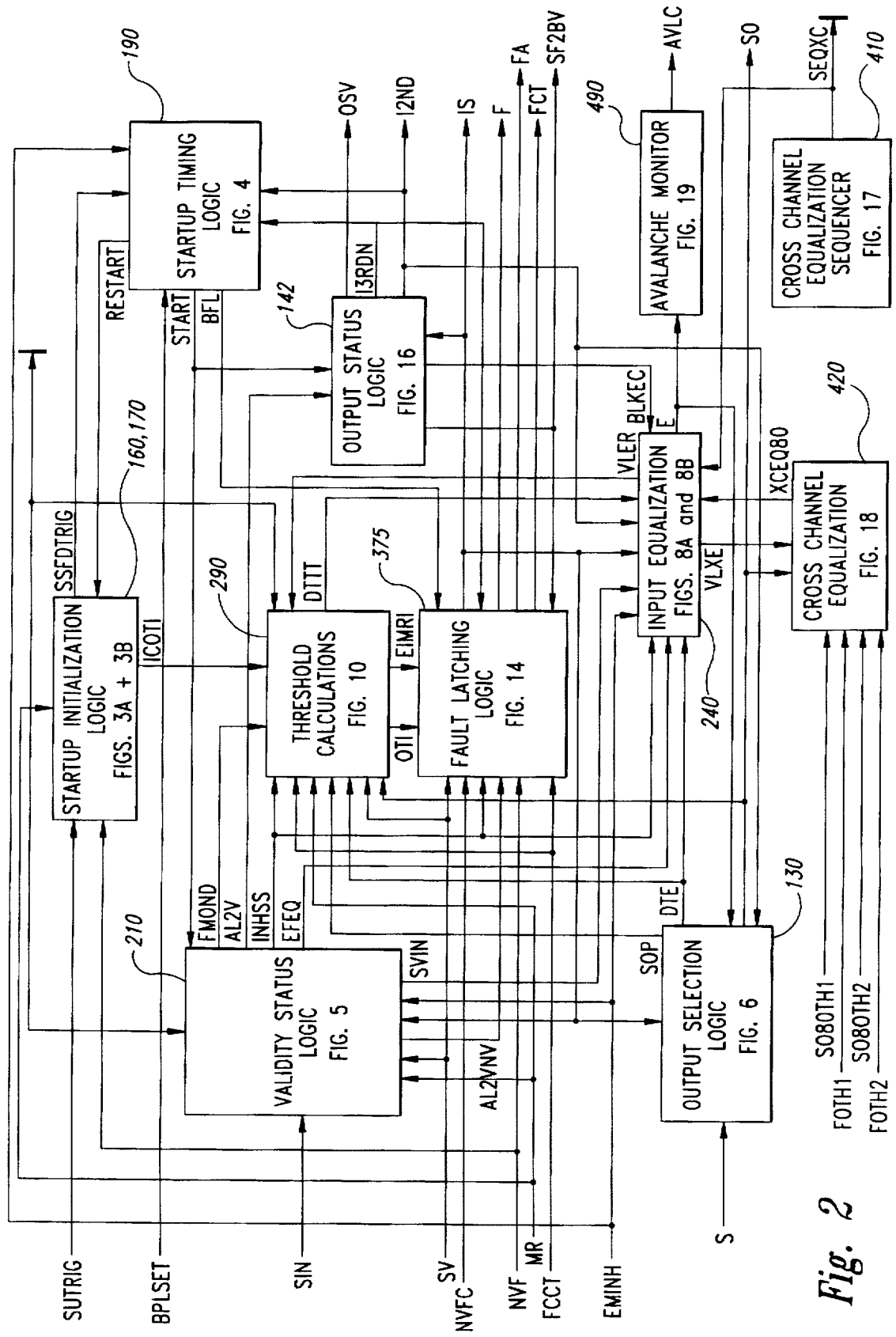
FIG. 2 is a block diagram of the signal selection and fault detection system of the present invention, showing the system of FIG. 1 as it is organized in subsequent detailed Figures.

Referring to FIG. 2, this figure shows the SSFD system 100 (FIG. 1) of the present invention showing how the present invention is organized with respect to. circuitry subsequently described in detailed More importantly, the block diagram of FIG. 2 provides an overview of the interconnections between the various circuits and subsystems shown and described in detail with respect to FIGS. 3 through 18. The block diagram of FIG. 2 shows the various signals input to, and output from, the various circuits and subsystems shown and described in detail herein with respect to FIGS. 3 through 19. The various signals shown in FIG. 2 and in the other figures are briefly described in the tables found in FIGS. 23A, 23B, 23C, 23D, 23E and 23F. The various blocks shown in FIG. 2 will now be described with respect to their corresponding circuitry as shown in more detail in FIGS. 3 through 19.

Figure 3A:
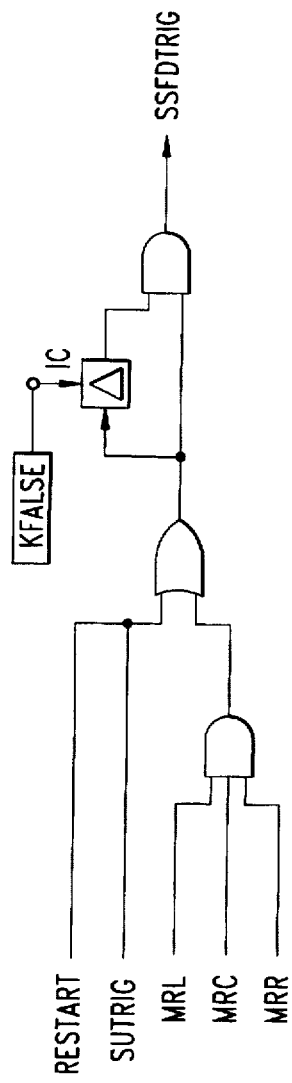
FIGS. 3A and 3B are schematic diagrams showing start-up initialization logic circuitry for the system of FIG. 2.
Figure 3B:
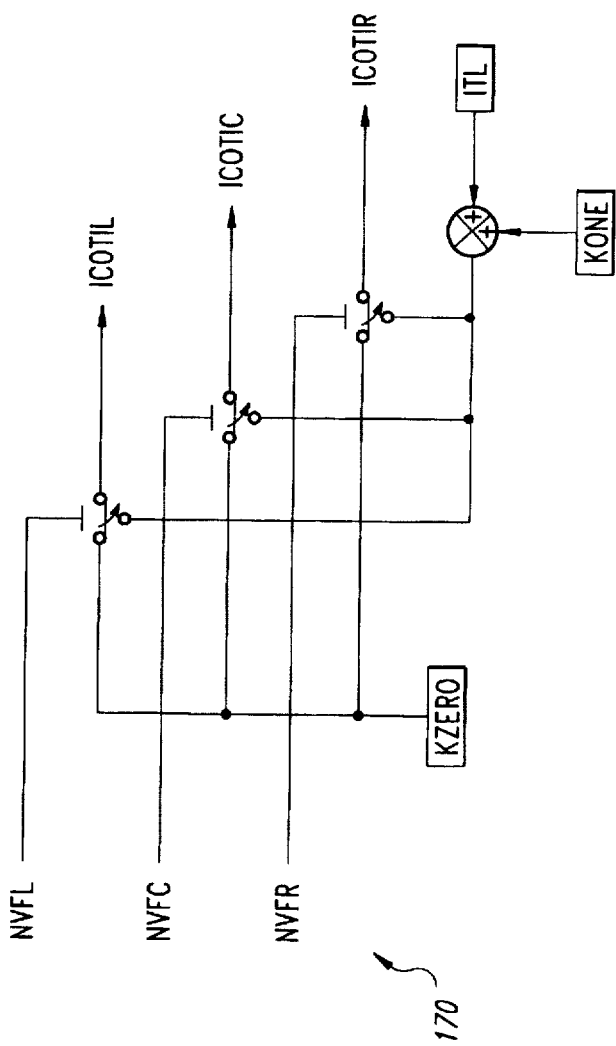

Referring to FIGS. 3A and 3B, start-up initialization logic circuits 160 and 170, respectively, are shown. The logic circuits 160 and 170 are generally self-explanatory. The circuit 160 generates an initialization trigger signal SSFDTRIG pulse for the system 100, which is the initialization trigger for starting up the SSFD process under system 100 of the present invention. The system 100 can start up by either left, center and right maintenance reset signals MRL, MRC and MRR, a restart signal RESTART, or a start-up trigger signal SUTRIG, all of which trigger initialization from a program executive that is stored in memory.

The RESTART signal is a discrete signal that is generated internally in the SSFD system 100 (e.g., in FIG. 4) to restart the SSFD process if the last two valid inputs are detected as disagreeing before start up is completed. The SSFD system 100 is designed to remain in start up mode until the start up process is successfully completed to produce a valid output. The pulsing of all three maintenance reset signals MR together provides a third method to trigger the start up process. This allows a maintenance person to restart the SSFD system 100 after it has been shut down by three latched faults.

Initialization logic circuit 170 in FIG. 3B determines left, center and right initial condition signals ICOTIL, ICOTIC, and ICOTIR for fault detection counters that are described below with respect to FIGS. 10 and 12. The initialization logic 170 receives left, center and right non-volatile fault latch signals NVFL, NVFC, and NVFR, respectively. The initialization logic circuit 170 determines the initial condition for out-of-threshold integrator signals ICOTIL, ICOTIC, and ICOTIR as follows. If a fault was recorded in non-volatile memory (not shown) under previous operation of the SSFD system 100, then an out-of-threshold integrator count OTI is initialized to a predetermined integration trip level ITL. Otherwise, the OTI count is initialized to zero. The out-of-threshold integration process under the present invention is described in detail below with respect to FIGS. 10 through 13B.

Figure 4:
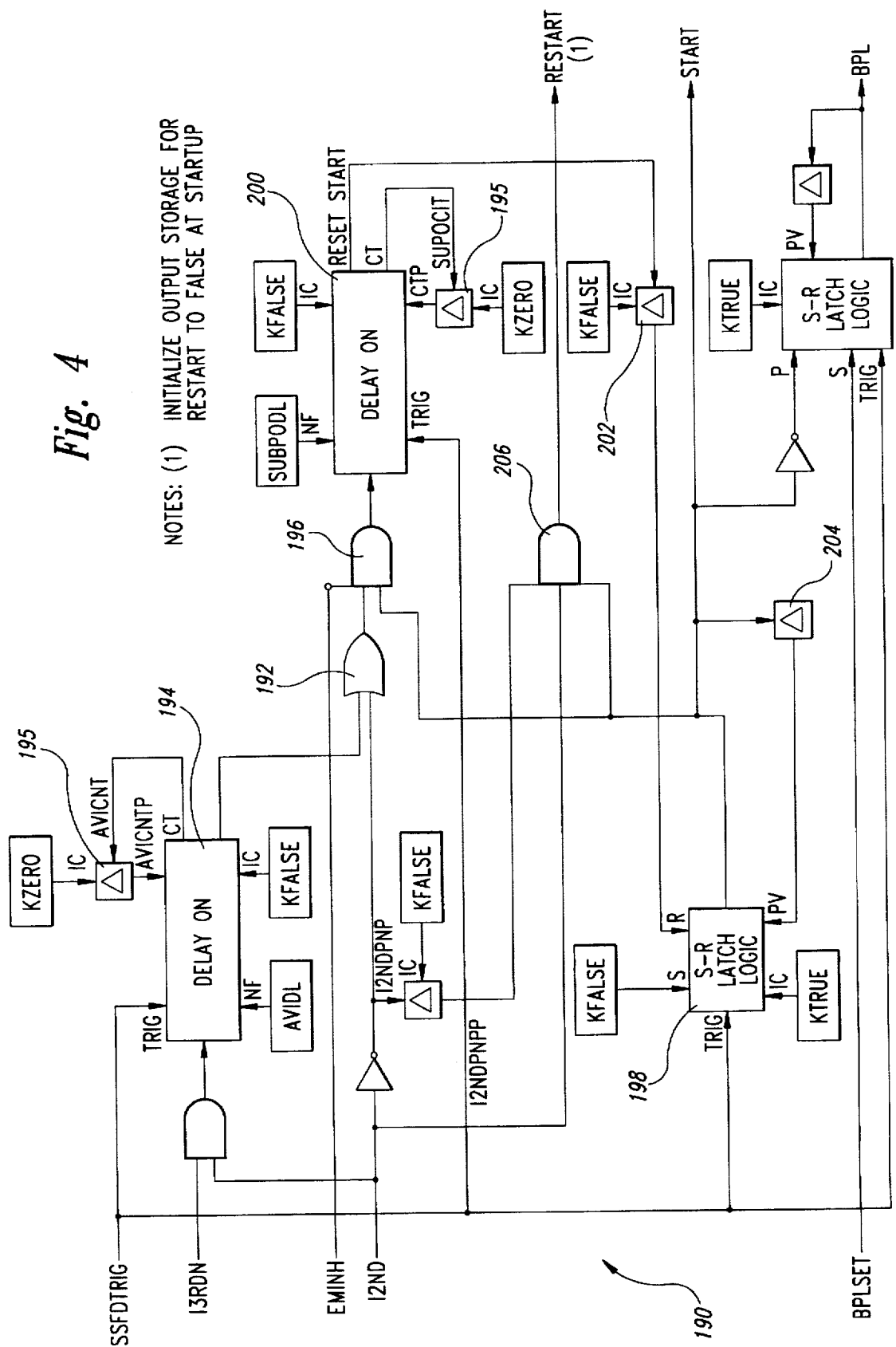
FIG. 4 is a schematic diagram of start-up timing logic circuitry for the system of FIG. 2.

Referring to FIG. 4, start-up timing logic circuitry 190 is shown, and the logic circuitry is generally self-explanatory from the figure. FIGS. 1–19 are schematic or block diagrams that depict the preferred embodiment of the present invention. The schematic diagrams generally use conventional symbology and nomenclature, and thus, similar symbols and nomenclature have similar or identical functions. FIGS. 23A–23F briefly describe the signal acronyms used in FIGS. 1–20. Certain circuit elements represented by possibly less familiar symbols or nomenclature are discussed herein in more detail. Without sacrificing clarity, but for brevity, and to orient one skilled in the art to the symbols and nomenclature employed herein, certain portions of FIG. 4 and other figures herein will be discussed in detail. From the detailed discussions of certain portions and circuit elements in selected figures, one skilled in the art can readily understand similar components in the remaining figures to understand and practice the present invention.

An OR gate 192 receives an output signal from a DELAY ON circuit 194 and the inverse or "Not" of the two signals isolated signal I2ND. The DELAY ON circuit 194 delays output of the input signal by a preselected delay amount. The preselected delay amount for the DELAY ON circuit 194 corresponds to a number of frames NF equal to a predetermined additional valid input delay AVIDL. The output signal remains a logical "0" value, or maintains a low or FALSE state, for the selected delay period after the input signal becomes a logical "1" value. The output concurrently reverts to a logical "0" value when the input signal does so.

The DELAY ON circuit 194 receives an initialization trigger signal SSFDTRIG from the start-up initialization logic circuit 160 of FIG. 3A. The DELAY ON circuit 194 receives an initial condition IC signal constant of KFALSE. The DELAY ON circuit 194 does not delay the output with respect to the input upon start-up because of the initial condition KFALSE signal. As used generally herein, the prefix "K" refers to a constant, and therefore the signal KFALSE refers to a constant having a logical FALSE value.

The DELAY ON circuit 194 determines the amount of delay, or keeps track of the amount of delay, by means of a delay element 195. The delay element 195 stores a previous count CT as an additional valid input frame count signal AVICNT. The previous value of the AVICNT signal, or AVICNTP, determines the amount of current delay of the input signal in the DELAY ON circuit 194. As used in the acronyms herein, the suffix "P" refers to a prior value for the given signal. The delay element 195 has an initial condition of zero or KZERO.

If either the I2ND signal is a logical "0" or FALSE signal, or the output signal from the DELAY ON circuit 194 is a logical "1" or TRUE value, the OR gate 192 outputs a TRUE signal to an AND gate 196. The AND gate 196 also receives a START latch flag signal from an S-R latch logic flip flop 198 and the inverse or Not value of an external monitor inhibit signal EMINH. If all three inputs to the AND gate 196 are TRUE, then a TRUE value is input to a DELAY ON circuit 200. The DELAY ON circuit 200, as with the DELAY ON circuit 194, receives the initialization trigger signal SSFDTRIG. The DELAY ON circuit 200 outputs a RESET START state latch signal that is delayed from the input signal by a delay value based on a prior count signal CTP that was previously stored in the delay element 195 based on a start-up phase out signal SUPOCNT stored therein.

The RESET START signal is delayed in a delay element 202 before being input to the RESET input of the SR latch logic 198. The RESET START signal is not initially delayed by the delay element 202 because of an initial condition IC signal KFALSE that is applied to the delay element upon initialization. Upon receiving the RESET START signal, the S-R latch logic 198 outputs the START signal. The START signal is delayed in a delay element 204 and input as a previous value or "PV" back into the S-R latch logic 198.

The start-up timing logic 190 contains circuitry to generate a by-pass latching signal BPL and timing circuitry for the start-up function to hold the SSFD system 100 in its start up mode for a sufficient time to allow detection of comparison faults among the input signals SL, SC and SR before the selected output signal SO is declared valid. The BPL latch signal is initialized to a logical TRUE and reset to a logical FALSE when start up is complete, or it can be held TRUE by the external BPLSET discrete because a set input overrides a reset input in S-R latches or flip flops. The BPL latch signal needs to be initialized as a logical TRUE for start up so that input signals, which may be invalid because a signal source LRU has not yet completed start up, will not be latched as faults. The START signal is initialized to a TRUE value by the SSFDTRIG signal. It is reset to FALSE when a start up phase out delay SUPODL, which is input to the NF terminal of the DELAY ON circuit 200, times out to signal completion of start-up.

The amount of the delay SUPODL is selected to allow sufficient time for comparison monitoring in the SSFD system 100 to detect a fault if only two valid input signals SL, SC or SR exist. Based on the gates 192 and 196 described above, the SUPODL delay is only allowed to count up the delay time when the following conditions exist: the EMINH signal is FALSE, the START signal is TRUE, either the I2ND signal is FALSE (indicating two valid inputs) or a 3 signals isolated signal I3RDN is FALSE and the I2ND signal is TRUE (indicating a single valid input), and the AVIDL delay signal has timed out the DELAY ON circuit 194 indicating a sufficient wait time since the first input signal has become valid to allow a second input signal to become valid. If a second input signal becomes isolated while the SUPODL delay is running, then the I2ND signal becomes TRUE and an AND gate 206 generates a RESTART pulse signal for the start-up initialization logic circuit 160, which generates a new SSFDTRIG and the start up process begins again.

Figure 5:
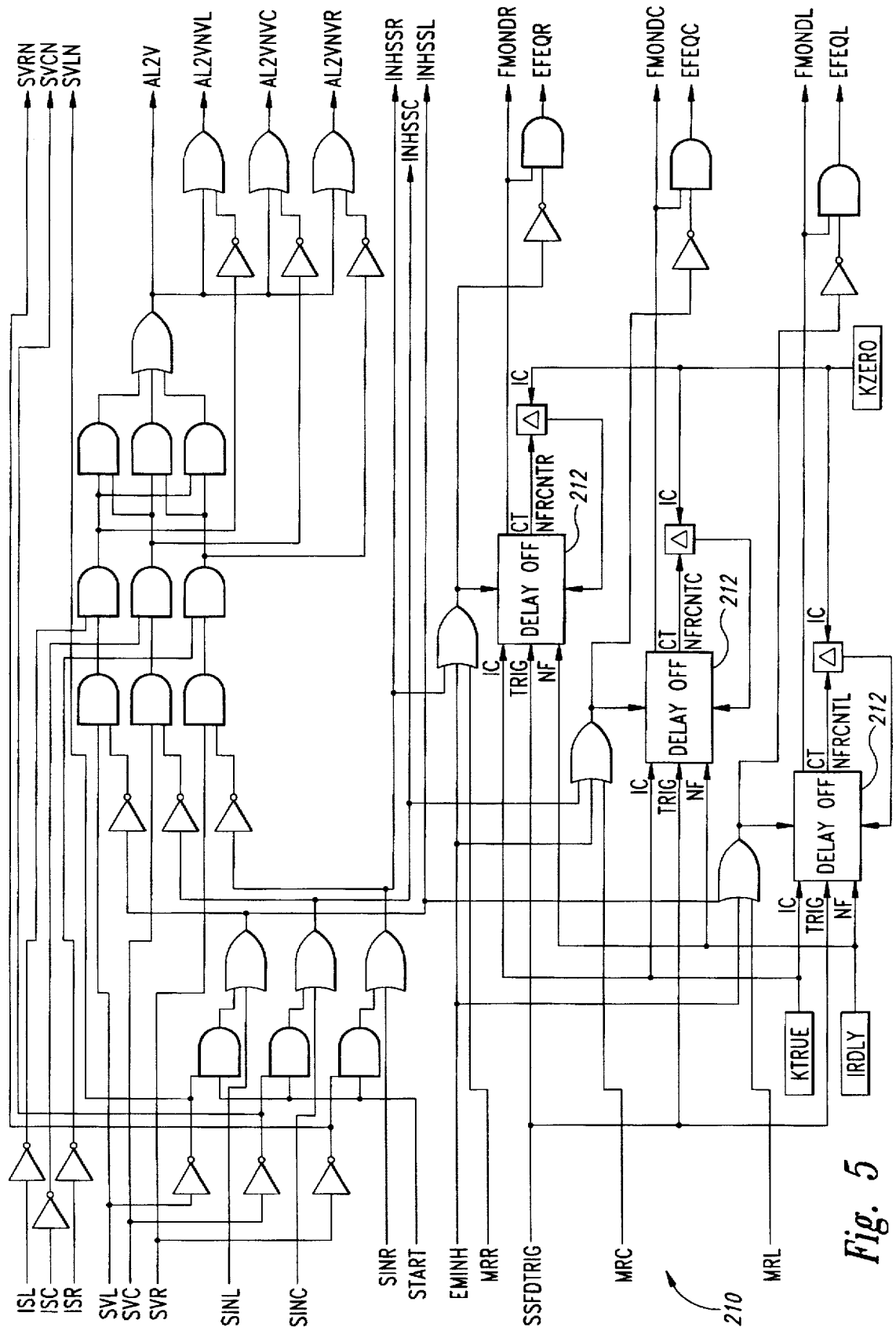
FIG. 5 is a schematic diagram of validity status logic circuitry for the system of FIG. 2.

Referring to FIG. 5, validity status logic circuitry 210 receives the START signal from the start up timing logic circuitry 190. The validity status logic circuitry 210 is generally self-explanatory. It includes DELAY OFF circuits 212 that, like the DELAY ON circuits, outputs a signal that maintains a logical "1" value, or maintains a high state, for a selected delay period after the input signal has changed back to a logical "0" value.

The validity status logic circuitry 210 generates the following signals: at least two valid inputs AL2V, and at least two valid inputs for signal i not valid AL2VNV (for i=L, C, R). During start up, "valid" implies totally valid, which means valid and not inhibited. In other words, valid in that no upstream monitoring has recognized an input signal as being invalid or bad. A signal is inhibited by means of the signal inhibit signals SINI and inhibit signal selection signals INHSSI. At start-up, all input signals are intialized as invalid. The validity status logic circuitry 210 then brings the input signals back online when both the signal valid signal SV is TRUE and the signal inhibit signal SIN is FALSE. After start-up, a valid signal means that the signal is valid (SV is TRUE) and not isolated by means of signal select circuitry (described below with respect to FIGS. 6 and 7).

Figure 6:
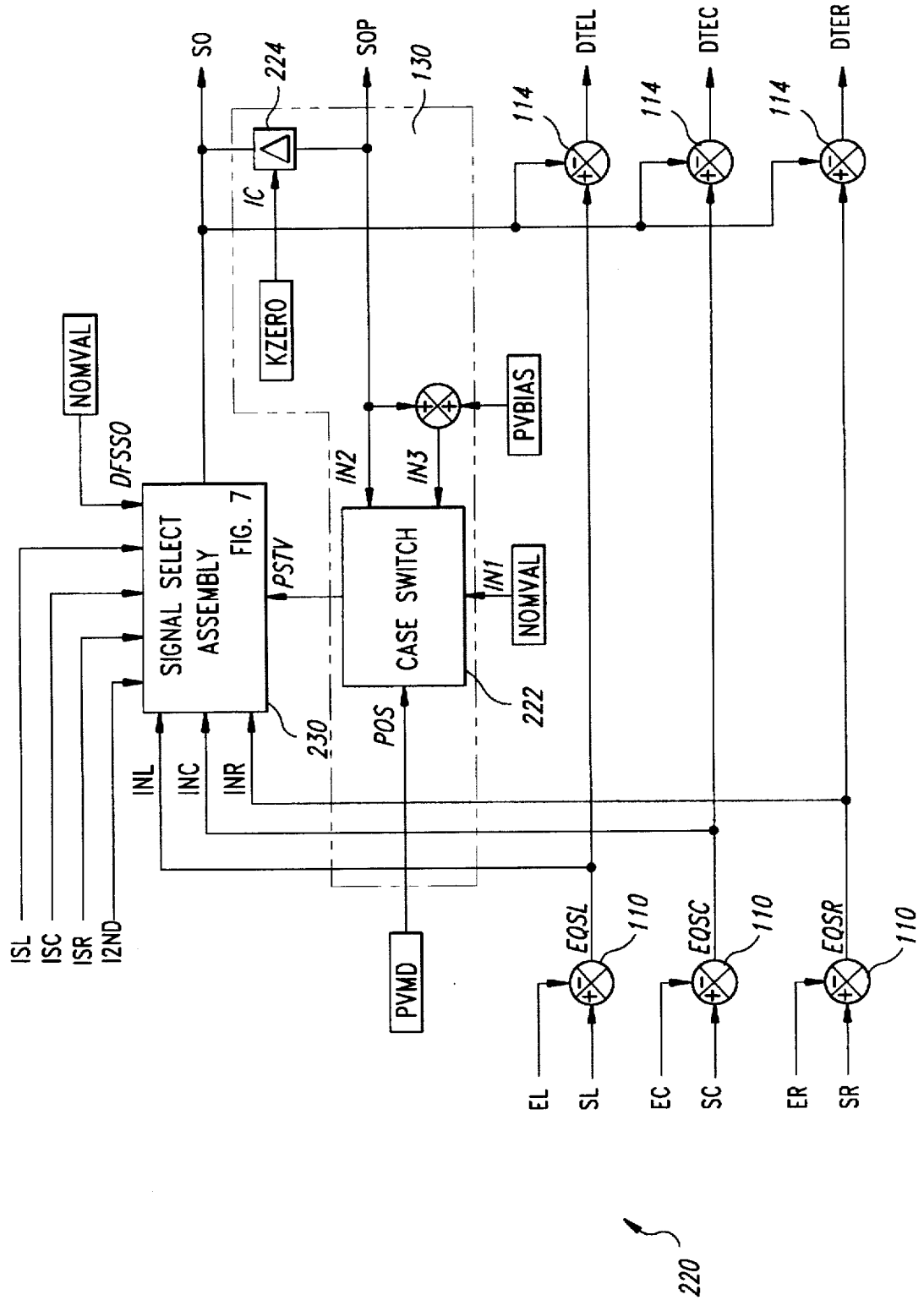
FIG. 6 is a partial schematic, partial block diagram of output selection logic circuitry for the system of FIG. 2.

Referring to FIG. 6, output selection logic circuitry 220 also referred to herein as the voting mode selection block 130, is shown as receiving the left, center and right input signals SL, SC and SR, and subtracting therefrom the left, center and right equalization signals EL, EC and ER in the adders 110 to produce the left, center and right equalized signals EQSL, EQSC and EQSR. The left, center and right equalized signals EQSL, EQSC and EQSR are input to a signal select assembly 230 that selects one of the three signals for output as the output signal SO based on either a past substitute vote signal PSTV or the default signal selector output signal DFSSO. A case which 222 selects one of three signals based on a position signal POS that is based on a past value mode switch position signal PVMD. The circuitry of FIG. 6 (and of FIG. 7) determine which input signal is output as the selected output signal SO. Actually make those circuits of those figures operate in a voting mode so as to select which of the three equalized input signals EQSL, EQSC or EQSR is selected as the selected output signal SO.

As those skilled in the art will appreciate, the midvalue signal selection circuitry (described below with respect to FIG. 7) selects the signal of three redundant signals that lies between the other two signals. When one of the redundant input signals has failed, a midvalue signal is no longer available, therefore, additional circuitry is required to vote to determine what value the selected output signal will take. The voting mode selection performed by the output selection logic circuitry 220 provides three options for the selected signal or vote to be substituted for a first failed input as follows.

First, the output selection logic circuitry 220 can select the past value of the selected output SOP, which is generated by delaying the selected output signal SO through a delay unit 224. The past value vote SOP provides the best blocking of oscillatory faults in bad input signals. However, the SOP vote has the weakness that it will allow the output signal SO to ratchet to a highest peak value since a remaining "good" (i.e., not faulty) selected input signal moves in the direction of a hard over fault that is occurring in a "bad" input signal. When a hard over second fault is isolated, then the selected output signal will return to the good input signal.

Second, the nominal value vote NOMVAL provides the best protection against second faults which are hard over faults because the selected output signal SO will either stay at the nominal value or follow the good input signal when it is between the nominal value and the hard over failure value in the bad input signal. Third, the biased past value vote PVBIAS adds a bias to the past value output SOP to generate a substitute vote. This works very well for signals that are expected to have a normal rate of change such as an aircraft's radio altitude signal during landing approach. Even while a second fault is being detected and isolated on the two remaining input signals, the selected output signal SO will either follow the remaining good signal or will continue to descend at the nominal descent rate.

Overall, the functioning of the output selection logic circuitry 220 is obvious from examination of FIG. 6. One feature of the output selection logic circuitry 220 worthy of note is that no multipliers are used in the signal selection and equalizations. The gains of the equalized and selected signals are effectively set to one. Rate limits are used to control the dynamic performance. An advantage of this is that the output selection logic can be mechanized with single precision fixed point arithmetic with no truncation errors. In the absence of noise, equalization will be perfect, i.e., it will equalize to the least significant bit.

Figure 7:
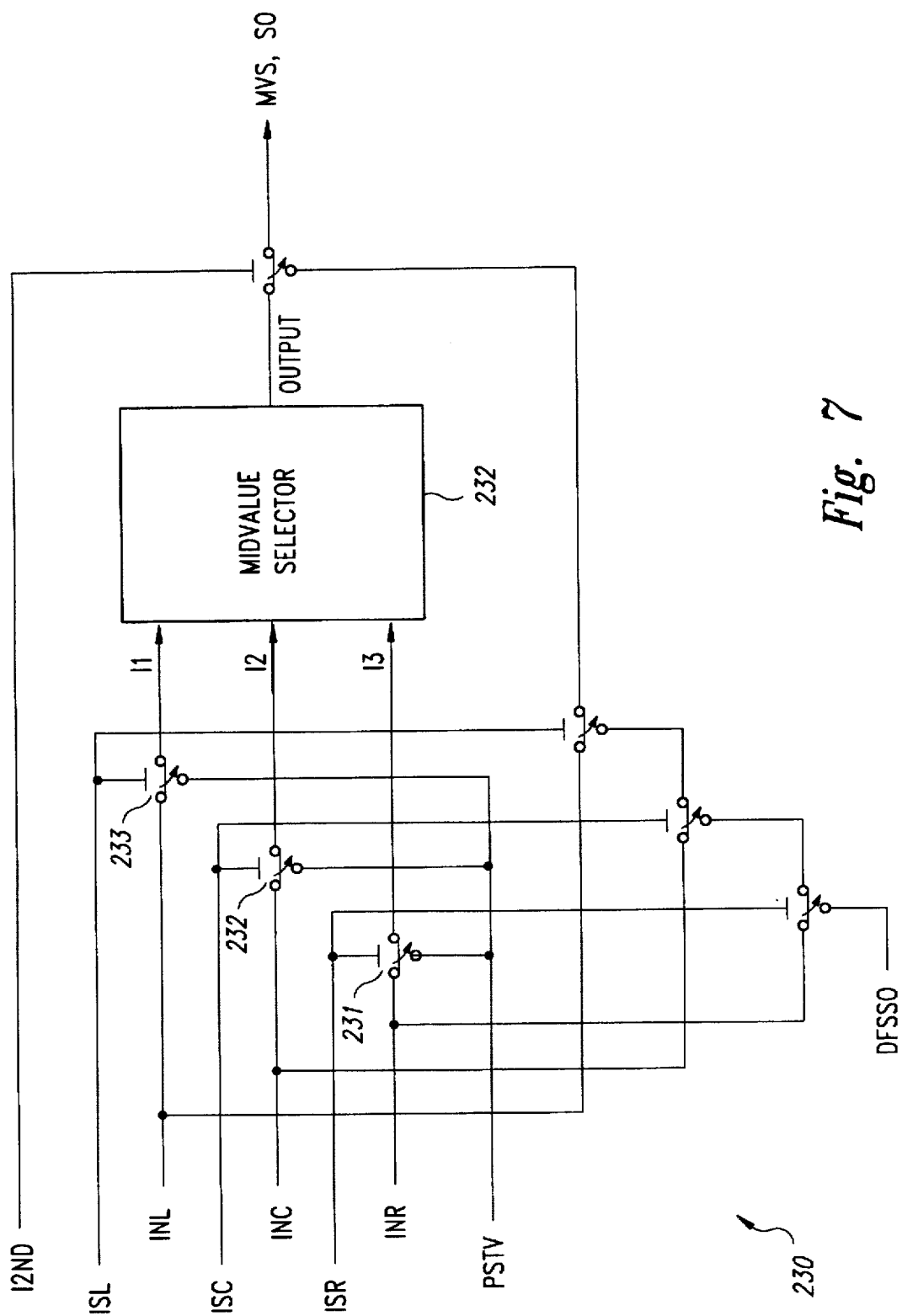
FIG. 7 is a partial schematic, partial block, diagram of signal select circuitry for the system of FIG. 2.

Referring to FIG. 7, the signal select assembly circuit 230 includes a midvalue selector 232 that may be selected from several midvalue selector circuits known in the prior art. The signal select assembly circuitry 230 performs essentially two functions. First, it uses the left, central and right isolate flag signals ISL, ISC and ISR (FIG. 14) to switch, via respective select switches 231, 232, and 233, the first failed input signal SL, SR, or SC to the midvalue selector 232 from the equalized input signals (INL, INC, INR) that are input to the midvalue selector to the substitute vote signal PSTU.

Second, when a second fault in, and isolation of, an input signal occurs, (as determined by the I2ND signal having a TRUE value), the signal select assembly circuitry 230 switches the midvalue selected output signal MVS, or output signal SO, to the last valid equalized input. Then, as described herein, the equalized drift corrector 120 will bleed off the equalizer on the remaining non-isolated input signal at a slow rate. If all three input signals are isolated, then the signal select assembly 230 switches the selected output signal SO to default signal select output DFSSO.

The midvalue selector 232 chooses the selected output from the equalized inputs EQSL, EQSC and EQSR (or INL, INC and INR) based on the following equation (where I1, I2 and I3 correspond respectively to equalized inputs EQSL, EQSC and EQSR):

If(((I1≧I2) AND (I1≦I3)) OR
((I1≧I3) AND (I1≦I2)))
OUTPUT=I1

Else If((I2 ≧I1) AND (I2≦I3)) OR
((I2≧I3) AND (I2≦I1)))
OUTPUT=I2

Else If(((I3≧I1) AND (I3≦I2)) OR
((I3≧I2) AND (I3≦I1)))
OUTPUT=I3

When an input signal is isolated from the midvalue selection by one of the isolate flag signals ISL, ISC, or ISR), then a substitute vote is used as determined by the voting mode selection described herein.

Figure 8A:
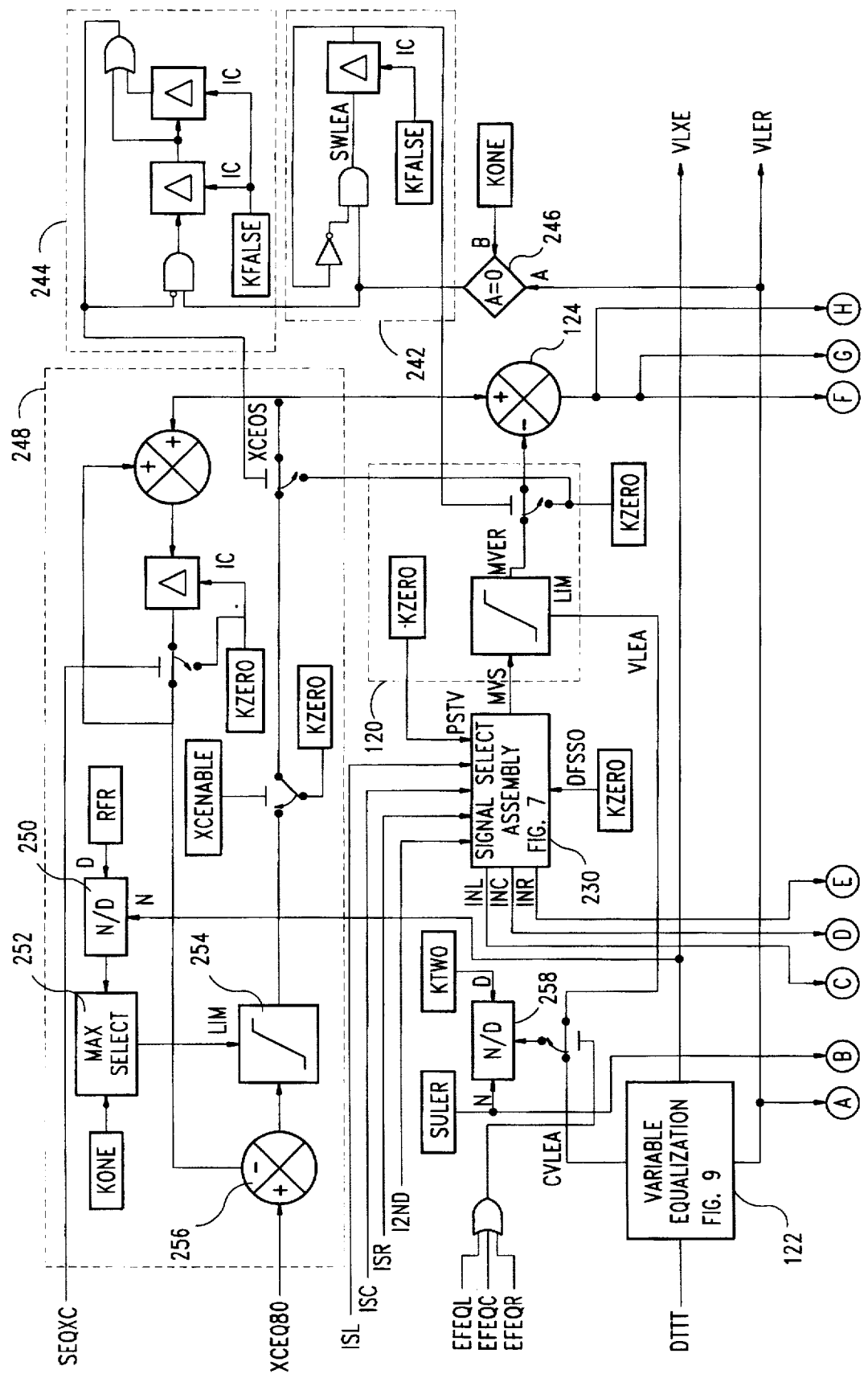
FIGS. 8A and 8B together form a partial schematic, partial block, diagram of input equalization circuitry for the system of FIG. 2.
Figure 8B:
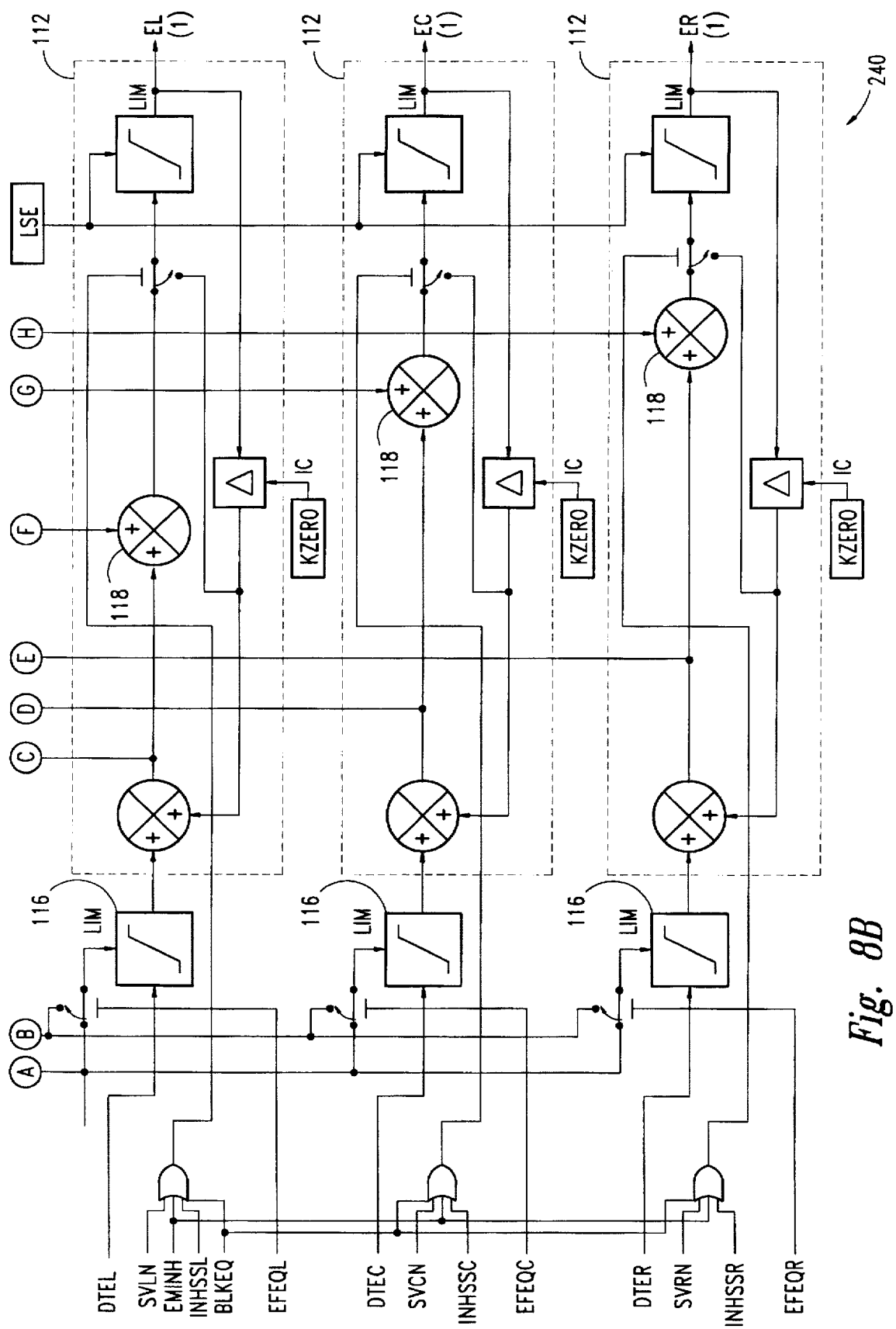
Figure 9:
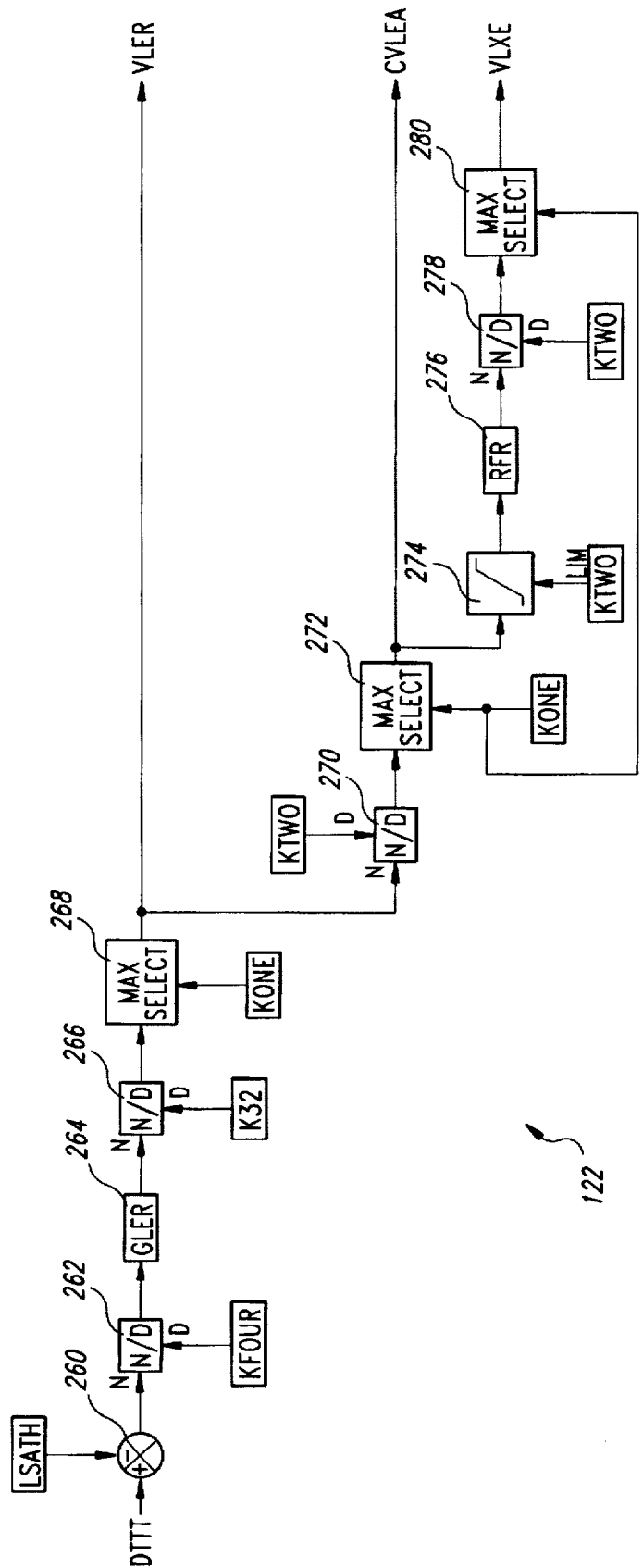
FIG. 9 is a schematic diagram of variable equalization calculation circuitry for the input equalization circuitry of FIGS. 8A and 8B.

Referring to FIGS. 8A and 8B, input equalization circuitry 240 is shown, which receives the left, center, and right dynamic tracking error signals DTEL, DTEC, and DTER from the adders 114 (FIGS. 1 and 6) and generates the left, center, and right equalized signals EL, EC, and ER therefrom. The basic signal equalization performed by the input equalization circuitry 240 is similar to that described in the above-referenced U.S. patent. Importantly, however, the input equalization circuitry 240 uses variable equalization rates generated by the variable equalization calculation circuitry 122 (FIGS. 1 and 9). The variable equalization rates and how they are distributed to the equalized drift corrector 120 and cross-channel equalization circuitry 126 (FIG. 18) are described in detail herein, generally with respect to FIG. 9.

Again, the input equalization circuitry 240 is generally self-explanatory with reference to FIGS. 8A and 8B. Many of the components have been described above with respect to FIG. 1. The input equalization circuitry 240 also includes two timing circuits: an alternate frame enable circuit 242 and an every third frame enable circuit 244. As noted above, the present invention is preferably implemented in software running on a computer such as a PFC. The software is generally divided into subroutines, each having execution time that corresponds to an integer multiple of the shortest execution time or "frame" (e.g., about 10–15 milliseconds). Therefore, subroutines needing to be performed in the shortest amount of time occur within one frame, while other subroutines are preferably performed in two, four, or eight frames.

A comparator 246 enables the frame enable circuits 242 and 244. The comparator 246 provides a TRUE output when both the input signal (the variable limit equalization rate VLER) is equal to a second signal (the constant 1). The frame enable circuit 242 outputs a TRUE or logical "1" value every other frame, while the frame enable circuit 244 outputs a TRUE or logical "1" value every third frame. The enable signals output by the frame enable circuits 242 and 244 are input to switches in the equalized drift correcter 120 and in an authorization circuit 248, respectively, to essentially inhibit overcorrection or equalization of a signal during the longest frame cycle (e.g., 8 times 12.5=100 milliseconds).

Again, the authorization circuit 248 is generally self-explanatory with reference to FIG. 8. As noted above, to aid those skilled in the art in quickly understanding the authorization circuit 248, and other circuits depicted under the present invention, a portion of the circuit will be described in detail. A dividing circuit 250 divides a numerator N (the variable limit cross-channel equalization VLXE) by a denominator D (a ratio of frame rates RFR). The result is input to a maximum select circuit 252 that selects the maximum value between the results of the division and a constant of 1 (KONE). The maximum value is then used to establish the limits of a limiter 254 that limits a cross-channel equalization signal XCEQ80 output from an adder 256.

Some significant features of the input equalization circuitry 240 include the following. First, any time fast equalization is enabled for any input signal by an enable fast equalization signal EFEQL, EFEQC, or EFEQR, then the variable drift correction rate limit VLEA is also increased to half as fast as the equalization rate limit by means of divider circuit 258 (i.e., one-half of the start-up value for the equalization rate limit: SULER/2). This assures fast equalization of each input signal to the selected output signal. Second, equalization is frozen on any input signal when the signal inhibit signal ISL, ISC, or ISR is true, or a signal valid signal SVLN, SVCN, or SVRN is FALSE. This is to prevent equalization from saturating and erroneously tripping avalanche warnings (FIG. 19), as well as to avoid an unnecessarily large time when the signal becomes valid again and must track back to the midvalue or selected signal.

Third, equalization is frozen on all input signals when an external monitor inhibit signal EMINH is TRUE. This is to prevent input signals from being equalized to wild signal motions that may be occurring. Fourth, the freezing of equalization in the second and the third items above also blocks any equalization change caused by drift correction and cross-channel equalization. Fifth, a few frames of fast equalization are enabled by an isolate reset delay IRDLY parameter any time either of the equalization freezes described in the second and the third items above are removed. This allows the input signal to get back on line without risk of nuisance faults caused by incorrect equalization.

The variable limited equalization rate VLER is calculated to provide the ability to equalize the offsets caused by gain tolerance as the offsets develop. Under the present invention, the allowed equalization rate can be restricted to the design limit for gain tolerance so gain variations that exceed design limits can be detected as faults. The rate limit on the drift correction is also variable in proportion to the variable equalization rate authority VLEA. The calculation of the variable equalization rates VLER, VLEA, and VLXE are generally described herein with respect to FIG. 9.

Referring to FIG. 9, the variable equalization calculation circuitry 122 receives the dynamic tracking tolerance threshold DTTT. A constant low signal activity value LSATH is subtracted from the DTTT by an adder 260 to provide a dead zone before the equalization rate begins to increase. The value LSATH is usually selected to dead zone out the effects of signal noise on the DTTT signal so that noise will not be continually opening (increasing) the allowed equalization rate. The signal output by the adder 260 is divided by a constant of 4 (KFOUR) in a divider 262, whose result is multiplied by a constant gain value GLER in constant multiplier 264. The constant GLER is a gain used to calculate equalization rate limit. The result of such multiplication is then divided by a constant of 32 in a divider circuit 266. The variable limit equalization rate VLER is selected as the maximum of one or the result of the calculations performed on the DTTT signal by the adder 260, dividers 262 and 266 and constant multiplier 264. In other words, VLER is equal to the maximum of one or:

(DTTT-LSATH)×GLER/128.

where GLER/128 is preferably selected to increase the variable equalization rate limit VLER in proportion to the gain tolerance induced offsets.

The calculated variable equalization drift correction CVLEA is allowed to be half the variable limit equalization rate VLER, by means of divider 270. The CVLEA is then selected as the maximum of either half the VLER or a constant of one (KONE), by means of maximum select circuit 272. While the CVLEA can have a minimum value of one, the alternate frame select circuit 242 (FIGS. 8A and 8B) removes every other frame of a midvalue equalization MVEQ correction when the variable limit equalization rate VLER is equal to one, so that the CVLEA becomes effectively equal to 0.5.

Likewise, the cross-channel equalization rate VLXE is calculated by first limiting the calculated variable equalization drift correction CVLEA to within a constant value of 2 by a limiter circuit 274. The resulting limited signal is multiplied by a constant RFR in constant multiplier 276, where RFR equals the ratio of frame rates between the number of frames required to perform the SSFD update process and the number of frames required to perform the cross-channel equalization process.

The value from constant multiplier 276 is divided by a constant value of 2 (KTWO) in divider circuit 278. The maximum value between the result of such division and a constant value of 1 is selected by maximum select circuit 280 to become the variable cross-channel equalization rate VLXE. To summarize, VLXE is calculated as:

VLXE=RFR/2 if CVLEA=1 or VLXE=RFR if CVLEA>1.

Again, frame select logic 244 (FIGS. 8A and 8B) provides that when VLER=1 the cross-channel equalization is only incremented every third frame under the SSFD system's process cycle. This assures authority relationships so that drift correction under equalization drift correction 120 can always overpower cross-channel equalization under the cross-channel equalization circuit 126 (FIG. 1). Further, the logic circuitry of FIG. 8 subtracts the cross-channel increments that occur from the variable limit cross-channel equalization rate VLXE so the total correction can never exceed VLXE. These features assure that failures in the left, center or fight channels that would cause an undetected erroneous value on the output signal SO in one channel cannot cross-couple through the cross-channel equalization to pull the outputs outside the bounds of the other two input signals.

Figure 10:
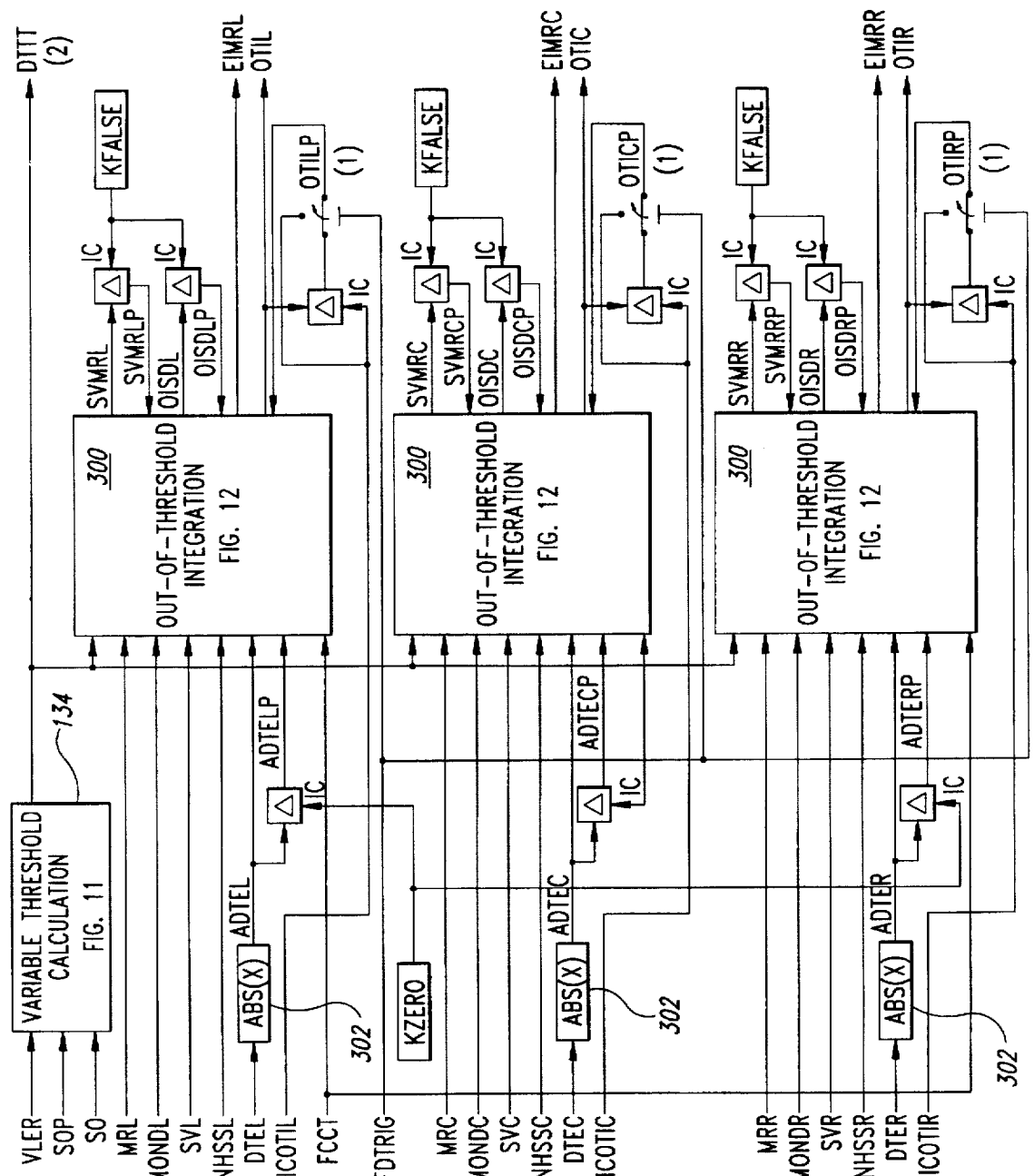
FIG. 10 is a partial schematic, partial block, diagram of threshold calculation circuitry for the system of FIG. 2.

Referring to FIG. 10, threshold calculation circuitry 290 is shown. In particular, FIG. 10 shows the interconnection between the variable threshold calculation circuitry 134 and out-of-threshold integration circuitry 300. For example, the variable threshold calculation circuitry 134 (shown in more detail at FIG. 11) receives the selected output signal SO, the prior selected output signal SOP and the variable limit equalization rate VELR, and outputs the dynamic tracking tolerance threshold DTTT to the left, center, and right out-of-threshold integration circuitry 300. The left, center, and right out-of-threshold integration circuitry 300 receive absolute value dynamic tracking error signals for the left, center, and fight channels, respectively. The absolute value dynamic tracking error signals ADTE are generated by absolute value circuits 302 whose output is equal to the absolute value of the input.

Figure 11:
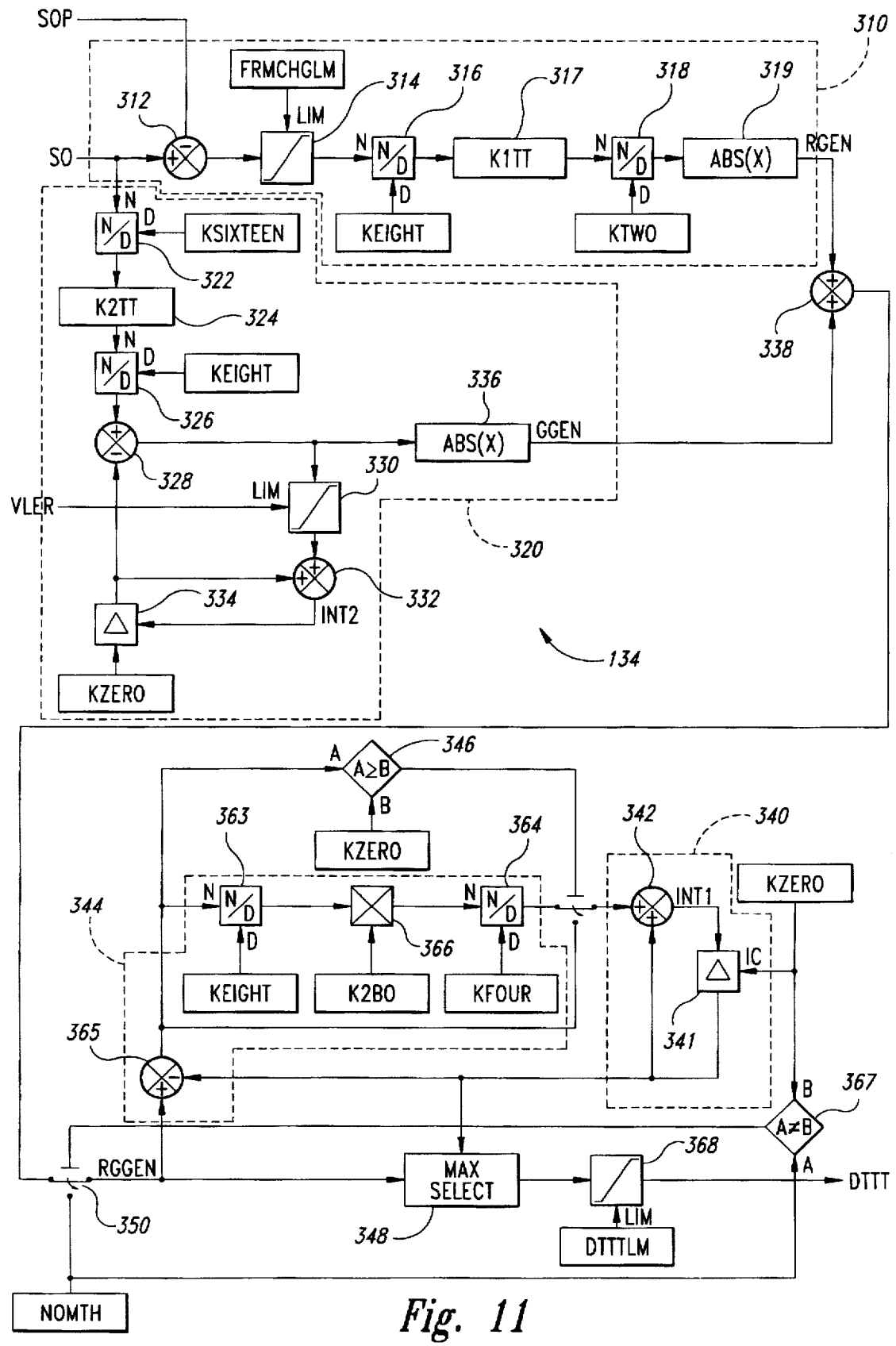
FIG. 11 is a schematic diagram of variable threshold calculation circuitry for the threshold calculation circuitry of FIG. 10.

Referring to FIG. 11, the variable threshold calculation circuitry 134 is shown that generates the dynamic tracking tolerance threshold DTTT. The DTTT essentially consists of two components: a component RGEN directly proportional to signal rate, and a component GGEN directly proportional to the change in signal magnitude. The rate generated component RGEN compensates for time skew effects and filter tolerances, while the gain generated component GGEN compensates for gain tolerances.

Rate generated component circuitry 310 subtracts the previous selected output signal SOP from the selected output signal SO in an adder 312 whose output is provided to a limiter circuit 314. The output of the adder 312 is limited to a maximum value equal to a frame change limit FRMCH-GLN to avoid potential overflow. The limited signal is divided by a constant value of 8 in divider 316, multiplied by a constant gain for varying DTTT with signal rate K1TT in constant multiplier 317, and then divided by a constant value of 2 in divider 318. Essentially, the constant value K1TT is divided by 16 for signal scaling purposes because the process under the present invention is preferably implemented in fixed point integer arithmetic. The parameter K1TT/16 is selected to equal a worst case for tracking errors that are a function of signal rate. The absolute value of the signal output by the divider 318 is input to an absolute value circuit 319 to become the signal rate component RGEN. The RGEN component is essentially calculated as follows:

RGEN=ABS[LM(SO-SOP)×(K1TT/16)]

where ABS means that the absolute value of the amount in brackets is taken, and LM means that the value in parenthesis is limited.

Gain generated component circuitry 320 divides the selected output signal SO by a constant value of 16 in a divider 322, multiplies the result therefrom by a constant gain for varying DTTT signal with magnitude K2TT in a constant multiplier 324, and divides the result by a constant value of 8 in divider 326. The result from the divider 326 is input to an adder 328, and then the absolute value from the adder, as taken by absolute value circuit 336, becomes the gain generated component GGEN. The gain generated component circuit 320 also includes a wash-out circuit consisting of limiter 330 (limited at a rate set by the variable limit equalization rate VLER), an adder 332, a delay element 334, and the adder 328. This washout circuit functions at the same exact rate as the variable equalization rate VLER so that the gain generated component GGEN decreases as equalization reduces gain tolerances induced by signal offsets. As a result, the gain generated component GGEN is calculated based on the following equation:

$$GGEN = ABS[SO \times K2TT \times (Wash\ Out)]$$

The RGEN and GGEN components are added together by an adder 338 to produce a combined component signal RGGEN, and then processed by a retention filter that includes a digital integrator 340 and a first order filter 344. The digital integrator 340 includes a delay element or memory 341 and an adder 342. Digital integrators are well known in the art. The first order filter 344 includes two divider circuits 363 and 364, an adder circuit 365, and a multiplier circuit 366 that multiplies the output from the divider circuit 363 by a constant gain for decay rate of the variable threshold DTTT (K2BO). The first order decay allows the input equalization circuitry 240 to catch up if a faulty signal drops quickly, e.g., to 0.

A comparator 346 and a maximum select circuit 348 allow the combined component signals RGGEN to increase, thus allowing the variable threshold DTTT to increase without delay, but restrains the rate at which the variable threshold DTTT can decrease based on the first order filter 344. The rate of such decrease is essentially adjusted by the constant gain for decay rate K2BO. The maximum value of the DTTT is restricted by a limiter 368 whose threshold is set by a dynamic tracking tolerance threshold limit DTT-TLM. A select switch 350 and a comparator 367 allow the variable component of the threshold DTTT to be fixed to a nominal value NOMTH. If NOMTH is not zero, then the variable component of the threshold DTTT is fixed to the value of NOMTH.

Figure 12:
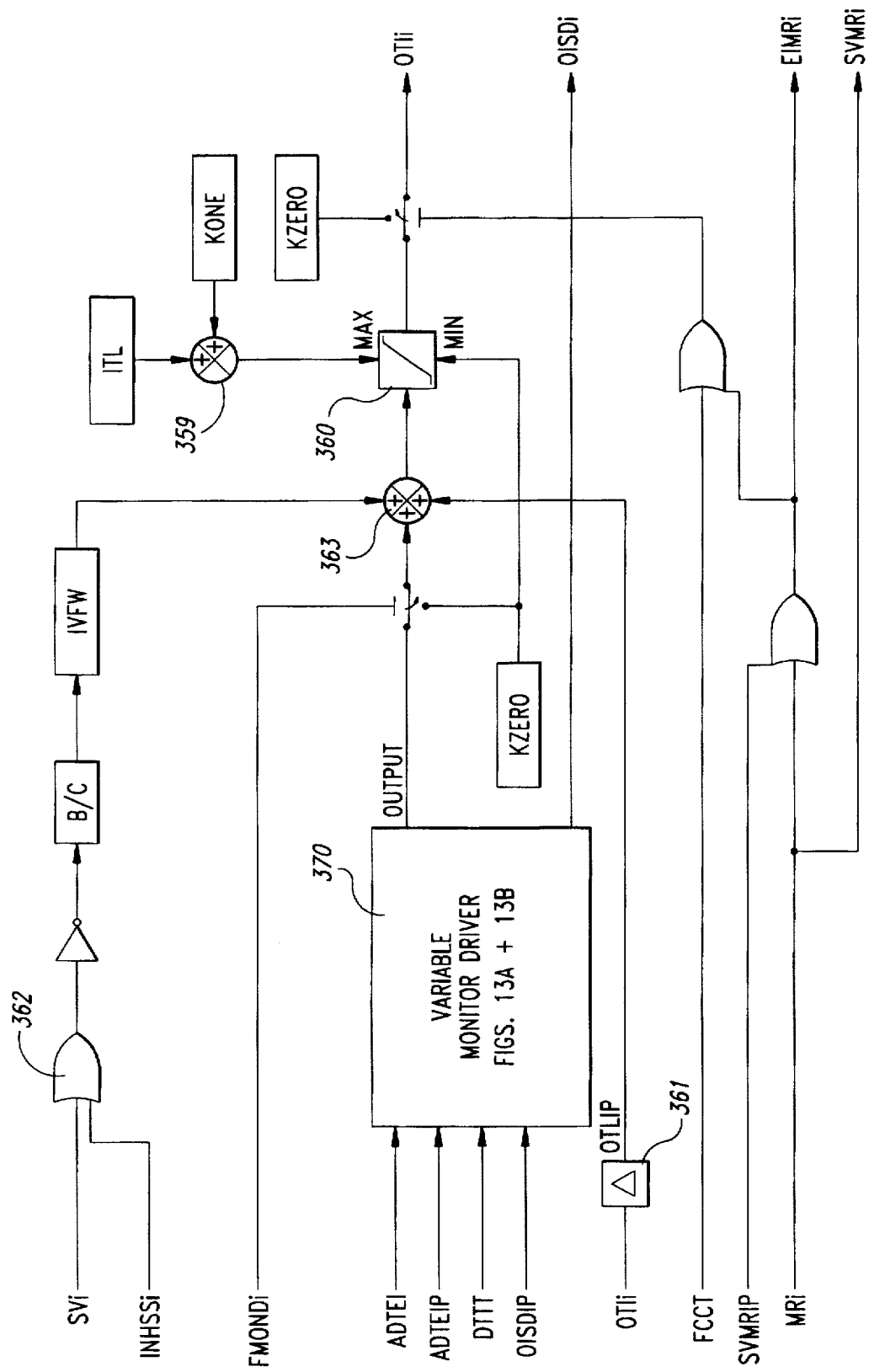
FIG. 12 is a partial schematic, partial block, diagram of out-of-threshold integration circuitry for the threshold calculation circuitry of FIG. 10.

Referring to FIG. 12, the out-of-threshold integration circuitry 300 generates the out-of-threshold integrator signal OTI. The OTI count is limited at a maximum by an integration trip level value ITL plus a constant of one (from adder 359) by means of a limiter circuit 360. The OTI count is limited at a minimum by a constant value of zero (KZERO). As a result, the OTI count is predictable, and therefore tracking times of out-of-threshold integration are predictable.

A past value of the OTII count, OTIIP, is generated by a delay element 361. The integrator adds an output signal OUTPUT to the past out-of-threshold integration value OTIIP by means of an adder 363 which forms the OTI counter. While not shown in each figure, past values for signals are generally generated by delay elements, some of which are not shown in the figures, but are implied by the acronym "P" used herein. Therefore, the absolute value of the dynamic tracking error ADTEI is generated by a delay element (not shown) to become the signal ADTEIP (where I is equal to L, C, or R).

Inhibit signals selection signal INHSSI are provided so that detected data bus faults are immediately removed from the signal selection process (described above) and thereby avoids erroneous latching of faults against all source sensors that put data on to the bus. The INHSSI signal is OR'ed in an OR gate 362 with the signal valid signal SVi so that when a signal is inhibited, a fault cannot be set by loss of signal validity. Likewise, a fault monitoring disable signal FMONDI prevents a miscompare between input signals from driving up the OTI count when either a signal is inhibited or the external monitor inhibit signal EMINH is TRUE. The EMINH does not block the setting of a fault due to loss of signal validity because the signal valid signals SVi should give correct indications of faults in situations where the EMINH signal is used. When the signal inhibit signal INHSSI for a given channel is set, the signal valid signals SVi are not considered to be dependable. The past value of the signal valid maintenance reset signal SVMRIP causes the extended interval maintenance reset input signal EIMRI to be a pulse two frames in duration (possibly required to correct a potential logic race problem). The maintenance reset input signals MRI cause the out-of-threshold integration count OTI to become 0, to thereby force a clearing of a fault.

Under such a system, signal equalization and monitoring can continue after an input signal is detected as failed. If the signal behavior resumes matching the selected output for a specified time, then the fault will unlatch and reinstate the input signal into the selection process. The unlatching is restricted to a specifiable number of times so that intermittent and mode dependent faults can be permanently latched out until reset by maintenance action. This is intended to avoid unnecessary maintenance removals as well as to maximize availability of the signals.

Figure 13A:
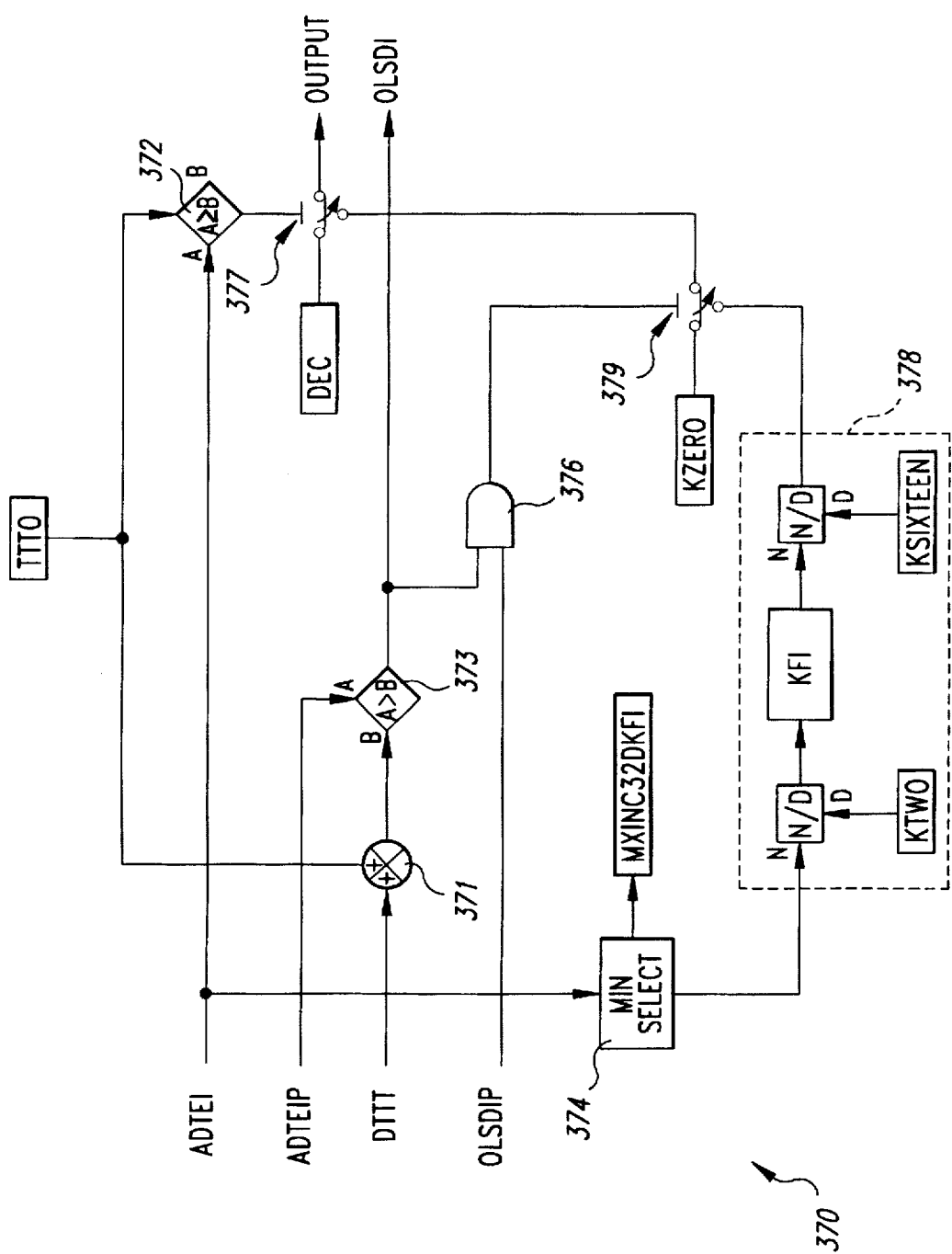
FIG. 13A is a schematic diagram of variable monitor driver circuitry for the out-of-threshold integration circuitry of FIG. 12.
Figure 13B:
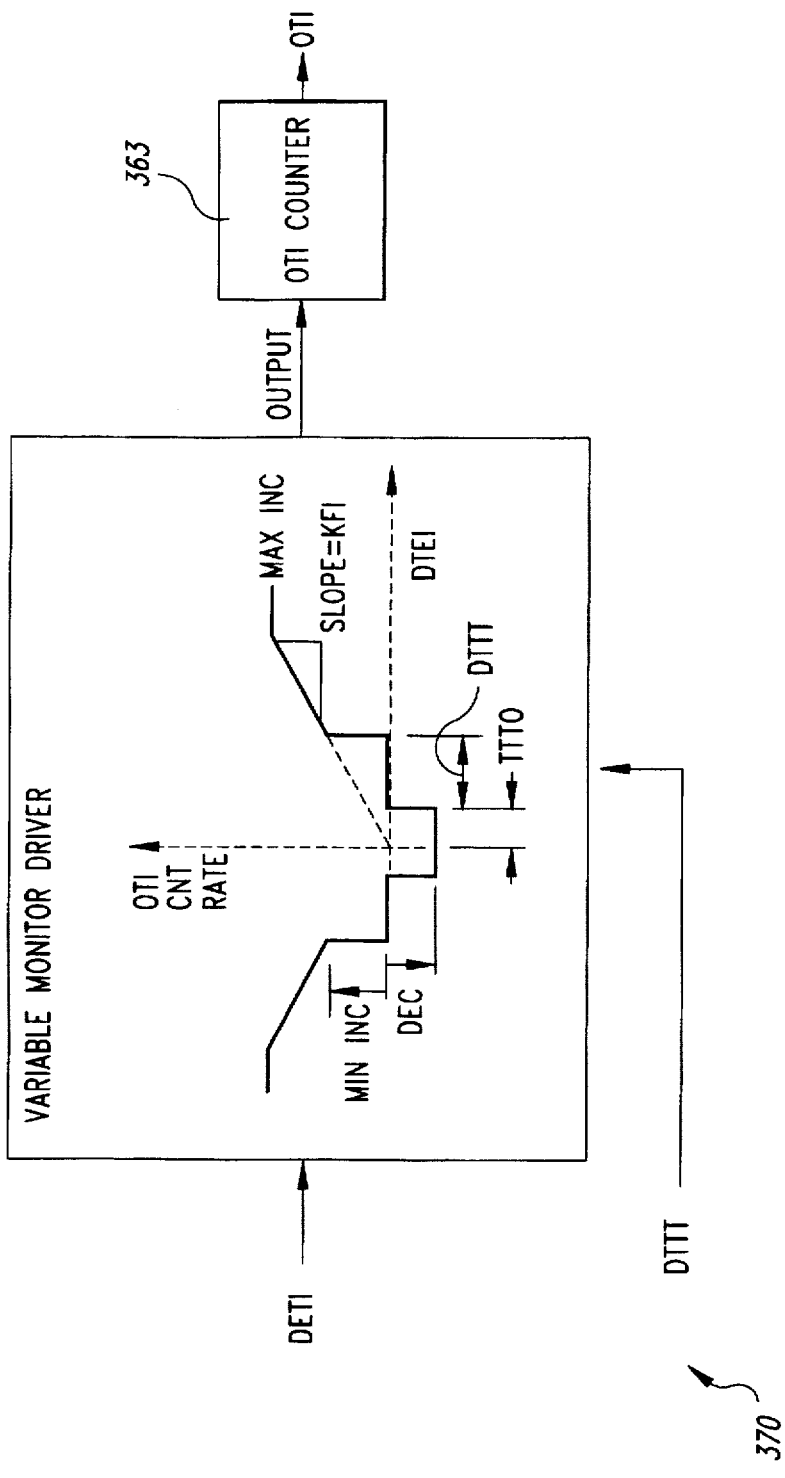
FIG. 13B is a block diagram that includes a plot of the output versus input of the variable monitor driver circuit of FIG. 13A.

Referring to FIGS. 13A and 13B, a variable monitor driver circuit 370 implements a time-magnitude threshold function so that tracking errors that exceed the threshold by a large amount will trip a fault much faster than tracking errors that barely exceed the minimum monitoring threshold. A plot of the time-magnitude threshold function is depicted in FIG. 13B. The logic circuitry to mechanize the function is shown in FIG. 13A. The monitoring threshold is composed of a constant portion TTT0 that is added to the variable portion DTTT by an adder 371. As explained above with respect to FIG. 11, the variable portion DTTT varies with signal rate to account for tracking errors caused by filter tolerance and time skew effects, and varies with signal magnitude to account for tracking errors induced by signal gain tolerances. The magnitude portion of the variation DTTT washes out at the same rate as equalization is allowed to occur.

By means of a comparator 372, if the absolute value of the dynamic tracking error ADTEI is less than the fixed portion of the monitoring threshold TTT0, then a constant out-of-threshold integrator decrement value DEC is output as the signal OUTPUT to the OTI counter 363. Otherwise, a switch 377 changes state to output a variable rate to the OTI counter 363.

By means of a minimum select circuit 374, a maximum for the out-of-threshold integrator rate signal OISDI is established by a constant maximum that the OTI counter can be incremented in one frame divided by a scaling factor of 32 (i.e., MXINC32DKFI). The minimum of the absolute dynamic tracking error signal ADTEI or the MXINC32DKFI is input to a multiplication circuit 378 that multiplies the minimum selected value by a slope rate of KFI shown in FIG. 13B. The multiplier circuit 378 multiplies a constant gain that relates threshold exceedances to fault count (i.e., KFI) and divides the amount by 32.

An AND gate 376 receives the tracking tolerance threshold exceeded signal OISDI and the previous value of the OISD (OISDIP). The AND gate 376 functions as a first frame exclusion logic that requires the monitoring threshold to be exceeded by two frames in succession before the out-of-threshold integrator signal OTI will count up to begin fault detection. If both inputs to the AND gate 376 are TRUE, then the switch 379 changes state and the variable rate from the multiplier circuit 378 is output to the OTI counter 363 as the signal OUTPUT. This provides protection for asynchronous operation so that when the channel leading in time first experiences a step change it will not begin detecting a fault until the other channels have had time to recognize the step change.

Figure 14:
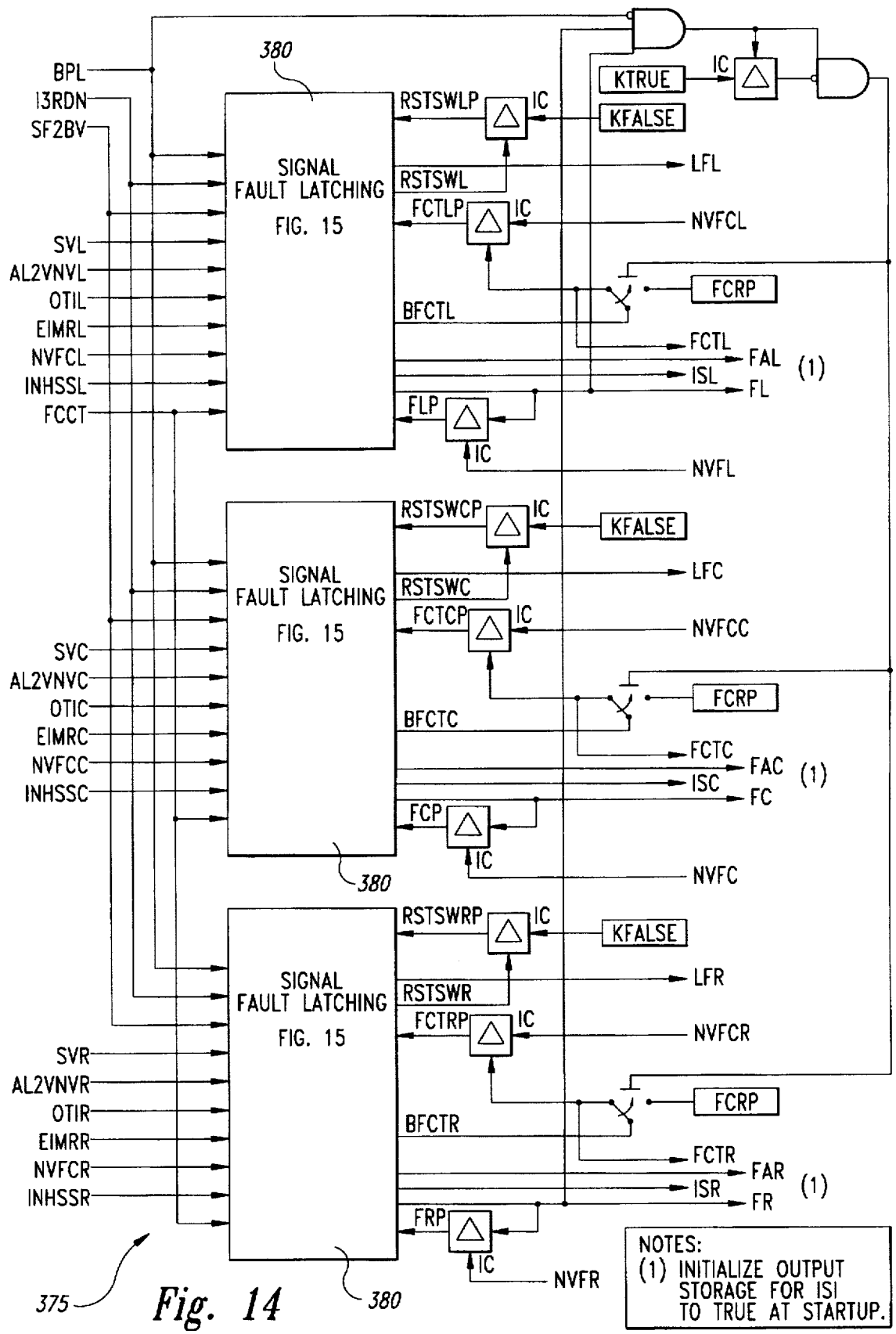
FIG. 14 is a partial block, partial schematic, diagram of fault latching logic circuitry for the system of FIG. 2.

Referring to FIG. 14, the fault latching logic circuitry 375 is shown. FIG. 14 particularly shows the interconnections of the fault latching logic circuitry 375 with left, center and right signal fault latching circuitry 380. The fault latching logic circuitry 375 is generally self-explanatory. The fault latching logic 375 loads a fault count FCT to a fault count reset prohibit FCRP value when three faults are detected and BPL is FALSE. The purpose for this is to prevent signals from tracking in and resetting after total failures have occurred (e.g., while in flight) when the BPL signal becomes TRUE (e.g., on the ground) and one or more inputs agree with the nominal value.

When a passive fault causes a "F2BV failure event" which sets faults against both remaining inputs by means of the F2BV signal, the fault latching logic 375 allows maintenance tests to be run and clear the fault against the good input signals. Thereafter, the fault latching logic 375 prevents the passively failed input signal from tracking in and clearing. The fault latching logic 375 avoids difficulties in fault status consolidation with three faults latched if some channels have counted up to the FCRP limit and others have not.

Figure 15:
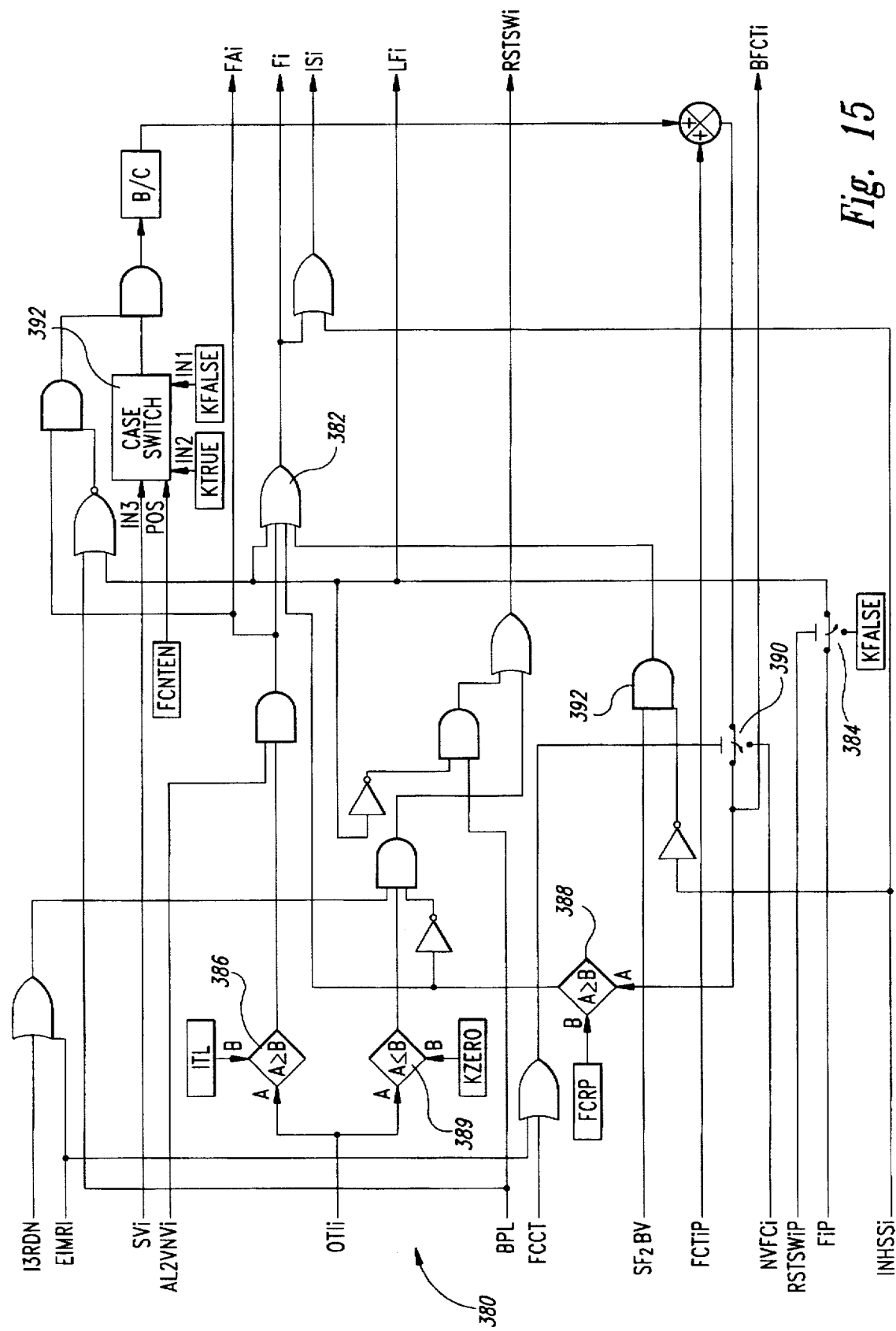
FIG. 15 is a schematic diagram of signal fault latching circuitry for the fault latching logic circuitry of FIG. 14.

Referring to FIG. 15, the signal fault latching circuitry 380 implements the fault latch by means of an OR gate 382 that outputs the fault latch signal FI (I=L,C,R). The past value of FI (i.e., FIP) is fed back into the same OR gate 382. A select switch 384, driven by a reset by a previous value and a reset fault latch signal RSTSWIP opens the feedback loop to allow the fault indication to unlatch (discontinuing the FI signal) if none of the inputs which set the fault are TRUE. Several inputs to the OR gate 382 can set the latch or hold the fault indication FI. First a fault setting from the OTII (for last I=L,C,R) being greater than or equal to the ITL and at least two valid OR signal I being not valid AL2VNVI by means of a comparator 386. This interlock with the AL2VNVI signal allows any first fault to set. For a second fault, however, it either allows only the invalid signal to set a fault, or it will allow the F2BV pulse to set faults against both signals if both are valid. Timing is a consideration in the signal fault latching circuitry 380 to obtain correct identification of a second fault to the invalid signal. Therefore, the upstream signal source validity monitoring must be faster than the SSFD comparison monitoring. However, it is not necessary for SSFD validity persistence time to be shorter than SSFD comparison monitoring persistence time.

A second input to the OR gate 382 derives from a comparison, by comparator 388, of a fault count signal of FCTI to a fault count reset prohibit signal FCRP. The resulting signal from the comparator 388 holds the fault latched when the fault count FCTI becomes equal to the fault count reset prohibit limit FCRP. A select switch 390 is driven by the output from OR gate 389 that receives a fault count consolidation trigger FCCT and an extended interval maintenance reset for signal I EIMRI. The select switch causes loading of the FCTI count to an initialization value of non-volatile fault count NVFCI (stored in non-volatile memory). Fault status consolidation will typically either set the fault count FCTI to zero or to FCRP. Maintenance testing will set the fault count to zero to clear the fault latch.

Loading the fault count FCTI to the value of FCRP will set a fault if one is not already set. This feature allows the signal fault latching circuitry 380 to consolidate the fault latch status by only consolidating the fault count values to zero or FCRP across all operating channels.

The third input to the OR gate 382 derives from the AND operation by AND gate 392 of a set pulse SF2BV (that occurs with two faults and both inputs valid) and INHSSI. The output from the AND gate 392 latches faults against all signals when the set fault 2 both valid signal SF2BV occurs. Such latching is blocked if the input signal is inhibited at the time the SF2BV signal occurs, i.e., an inhibit prevents any change to the existing fault status of a signal.

A reset fault latch signal RSTSWI disables or opens the latch under two conditions. First, if the OTI counter decrements back to zero, the FCT signal is less than the FCRP signal, and all three inputs are not isolated. Second, if the extended internal maintenance reset signal EIMRI is pulsed. If all three inputs are isolated, then the fault latches are not allowed to reset by the OTI counting down because there is not a valid output for the input signals to track in with. However, signals can be isolated by signal inhibits without fault latches being set. The inhibited signals are reinstated to the signal selector assembly 230 when the inhibits go away. The EIMRI signal forces the OTI count to clear to zero so it can always unlatch the fault. If the fault is still active it will set again.

Under the signal fault latching circuitry 380, if the respective fault latch for the channel is not latched when the BPL signal is set TRUE, then the latch enable switch (driven by the RSTSW signal) opens and remains open until the BPL signal is set FALSE again. With the latch enable switch open, faults will be indicated when the OTI count is equal to or greater than the integration trip level ITL and the indication will be immediately cleared if the OTI count is decremented below the ITL. This allows maintenance crews to have rapid indications of when faults induced by on ground maintenance operations are corrected. For example, if a fault is induced on ground by opening a connector, then the fault indication will rapidly clear after the connector is reconnected.

Faults which latch with the BPL signal set to FALSE (e.g., the in-air mode) must decrement all the way to zero before the fault indications (both FI and FAI) will clear on the ground with the BPL signal set to TRUE. This results because the RSTSW switch will not open until the FI flag is set to FALSE. To retain latched fault status for passive faults that are only detectable with signal activity and intermittent and mode dependent faults, the FCRP parameter is preferably selected to be small enough so that fault counts will be incremented to the FCRP value during one flight.

A case switch 392 determines in which of three modes the fault counting operates. The three modes are selected by the fault count enable signal FCNTEN. In the first mode when FCNTEN is set to 1, no faults are counted. This mode should be selected if it is desired to have unlimited track-in and fault reset capability. In the second mode, when FCNTEN is set to 2, both validity and comparison faults are counted. This mode should be selected where it is desirable to latch a permanent fault against intermittent validity faults. In the third mode, when FCNTEN is set to 3, only comparison faults are counted. This mode should be selected where the validity monitoring in the signal source is expected to permanently latch its mode dependent and intermittent faults, or where intermittent validity faults will not cause operational problems.

Figure 16:
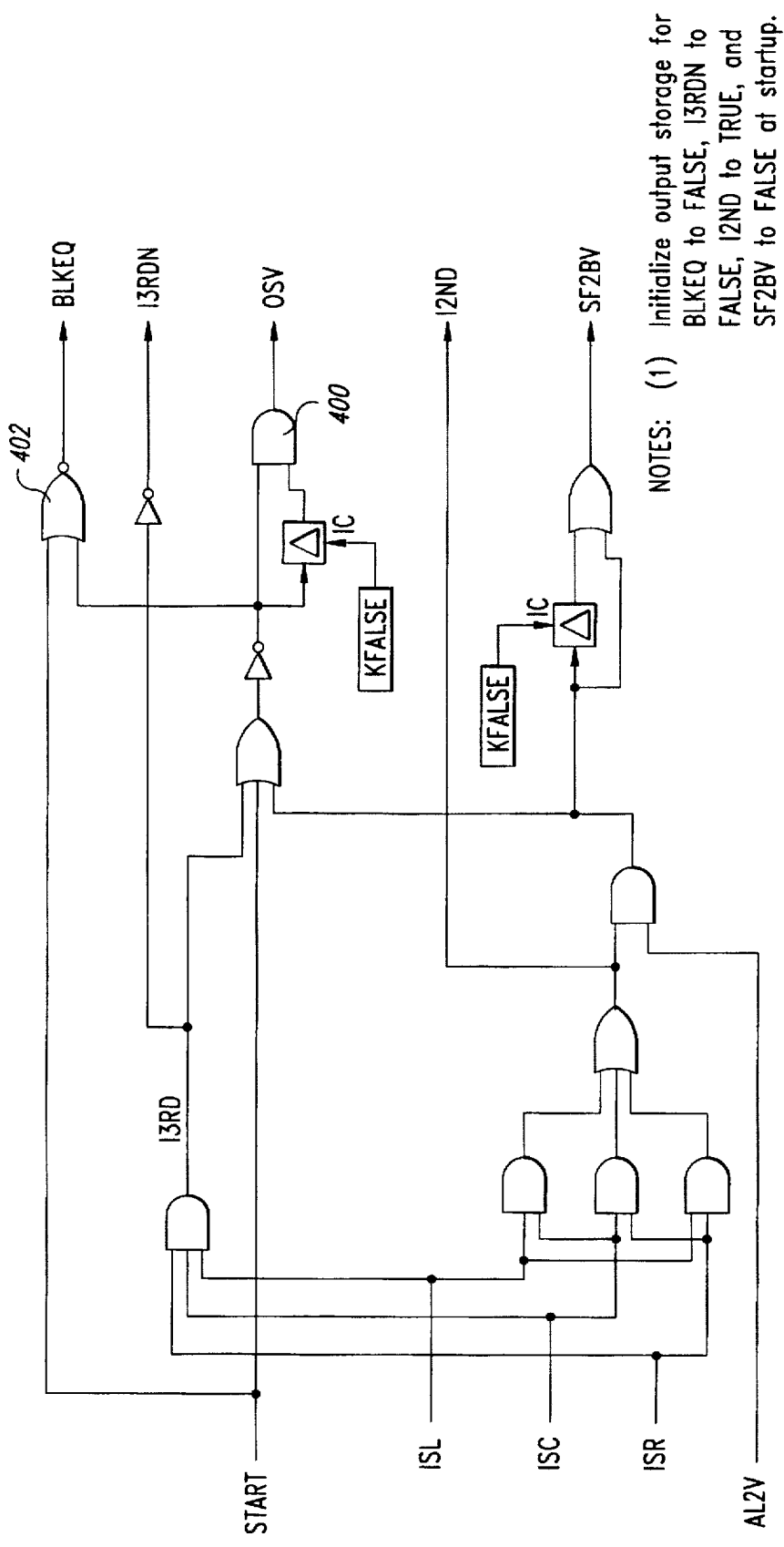
FIG. 16 is a schematic diagram of output status logic circuitry for use in the system of FIG. 2.
Figure 20:
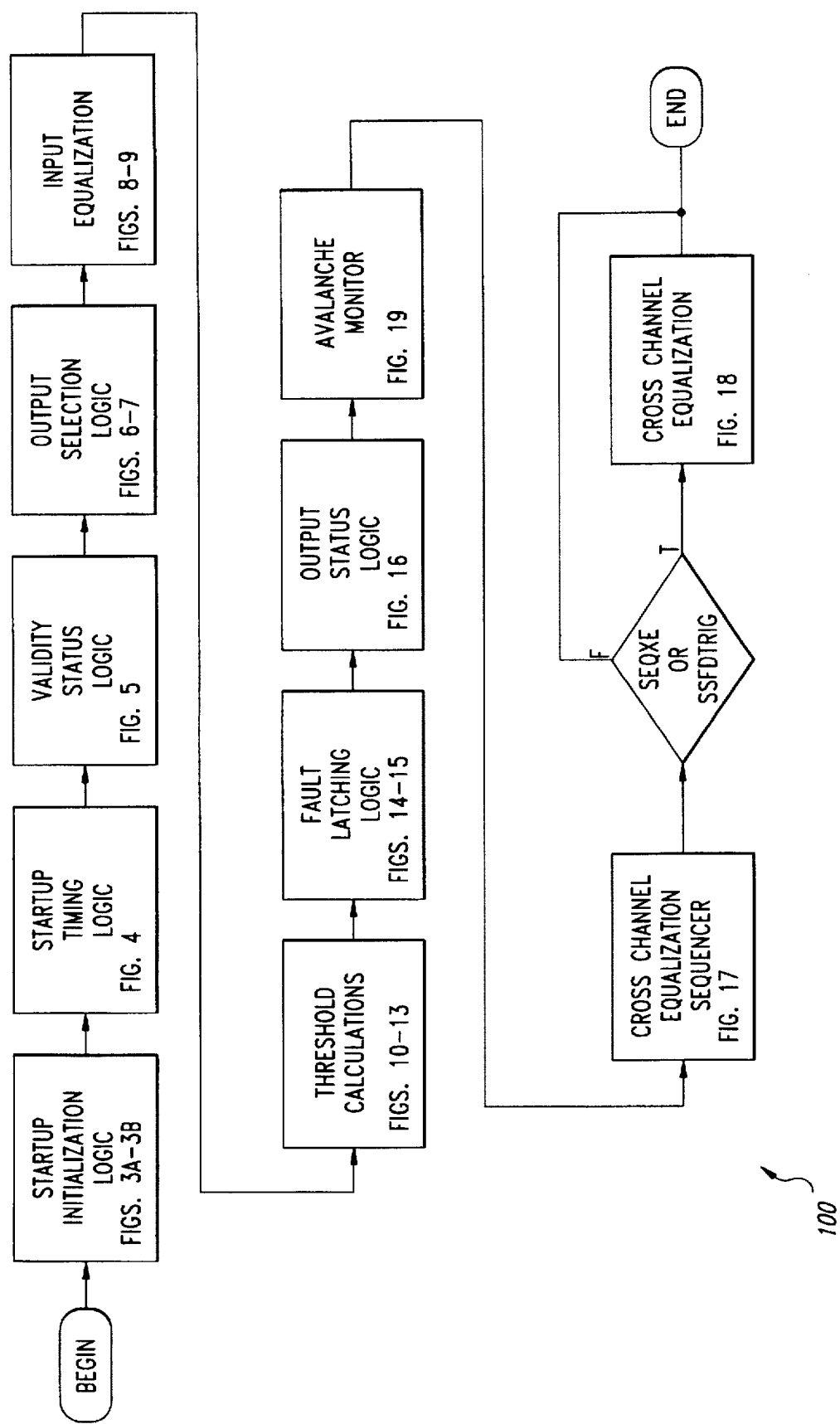
FIG. 20 is a block diagram showing a sequence of operations under the system of FIG. 2.

Referring to FIG. 16, the output status logic circuitry 142 is shown, and is generally self-explanatory. An output signal valid signal OSV is AND'ed by AND gate 400 with its own past value for a one frame delay to allow the OSV signal to become TRUE. This delay is necessary to avoid declaring the output signal SO valid for one frame while the output is still set to the NOMVAL value when recovering from all valid inputs inhibited. A NOR gate 402 generates a block equalization signal BLKEQ to block fast equalization from occurring unless the output is either the valid signal SOV or the SSFD system 100 is in its START mode based on the START signal. It is not necessary to have the additional frame of delay in the OSV input to NOR gate 402 because the computation sequence under the present invention preferably processes the output status logic after the equalization (as shown in FIG. 20).

Figure 17:
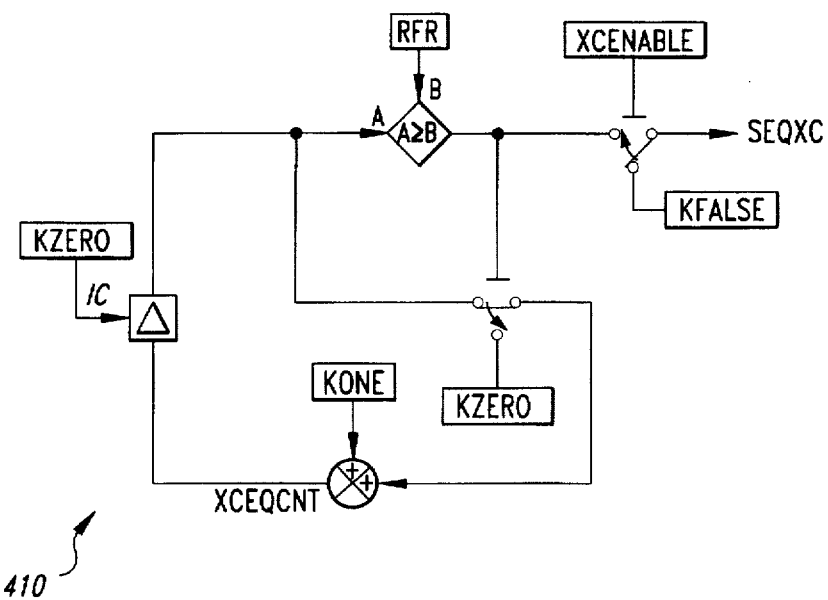
FIG. 17 is a schematic diagram of cross-channel equalization sequencer circuitry for use with the system of FIG. 2.

Referring to FIG. 17, cross-channel equalization sequencer circuitry 410 is shown, and is generally self-explanatory. This logic sequences the calculation of the VLXE signal to occur every 100 msec (the longest frame time) so that cross-channel equalization has minimum impact on data bus loading.

Figure 18:
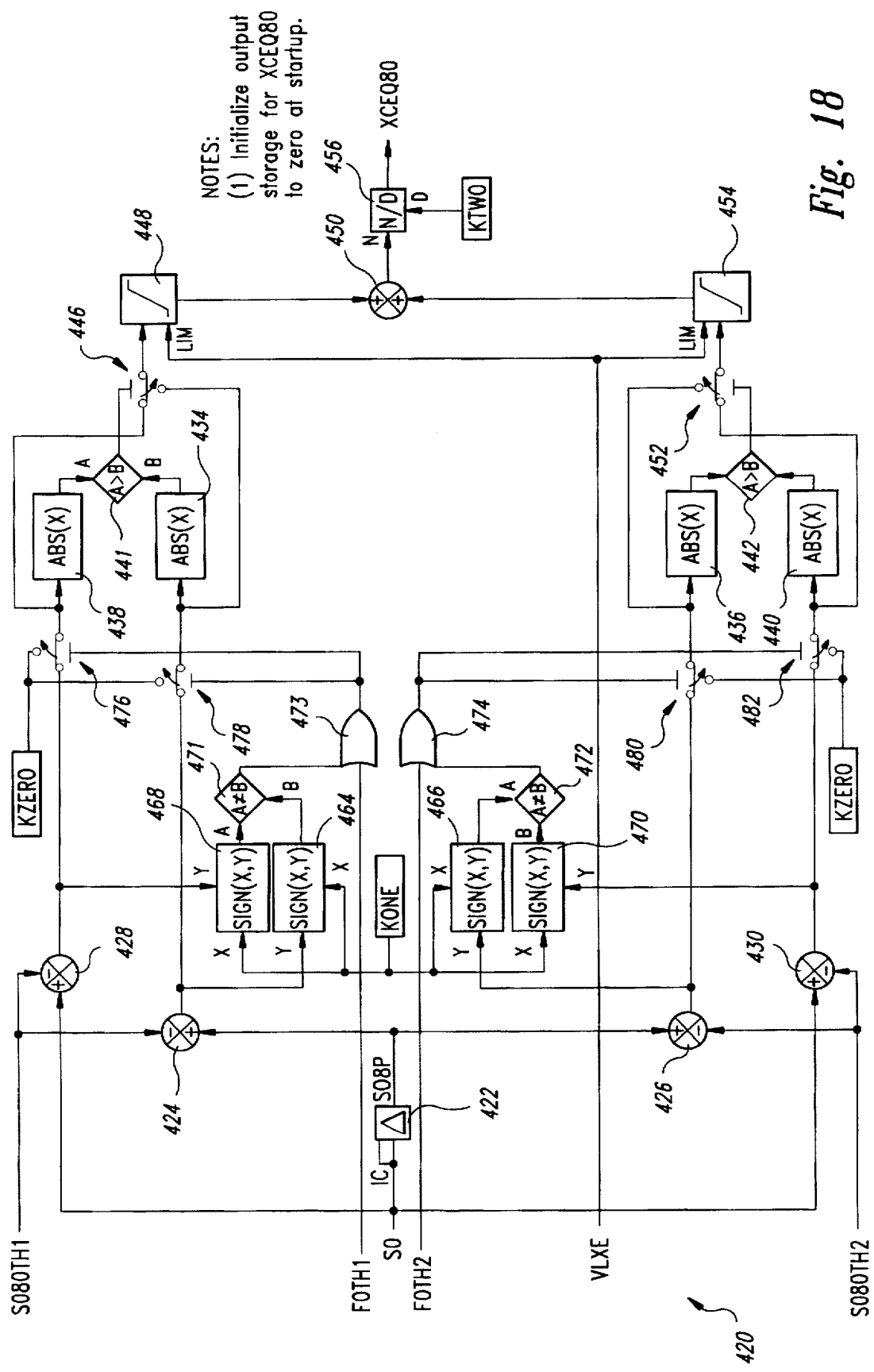
FIG. 18 is a schematic diagram of a cross-channel equalization circuit for use in the system of FIG. 2.

Referring to FIG. 18, cross-channel equalization circuitry 420 is shown that solves the problem of assuring that for two input operation, the outputs for the redundant channels track to the same selected static value. Without either some defined target for the outputs to track to, or cross-channel equalization, then the SSFD outputs between channels could differ by as much as the difference between the inputs.

Prior solutions to the problem of making the SSFD outputs from redundant channels track for two input operation have generally used the average of the low pass values for the two inputs as a target for the low pass value of the output. The weakness with this approach is that it allows a slow drift fault on either input to drag the output way beyond the normal bounds of the inputs before the fault is detected. Furthermore, it depends on not allowing input faults to occur asymmetrically between the redundant control channels to assure channel tracking. Thus, some kind of full time cross-channel fault status consolidation is required to assure tracking of the SSFD outputs across all redundant channels.

The cross-channel equalization circuitry 420 provides several advantages. If one of the two inputs incurs a slow drift fault, the output will typically not follow the slow drift, and thus the fault will be detected with minimum drift of the output. Cross-channel data can be exchanged at a very slow rate (e.g., every 100 msec) and time skew between channels will not cause equalization errors. The channel outputs are still forced to track even if faults are detected asymmetrically between channels. Thus, good channel tracking is obtained without full time fault status consolidation.

The details of how the cross-channel corrections are calculated are shown in FIG. 18. Cross-channel equalization is done every eighth minor frame, using the latest sample of the selected output signal SO in the local channel. This 100 millisecond sample of the selected output signal SO is delayed one frame (100 MSC) of the cross-channel equalization processing by delay element 422 to generate the SO8P signal. Signals from the two non-selected channels (other 1 and other 2 signals) are similarly sampled by delay elements (not shown) to generate signals SO8OTH1 and SO8OTH2 that are selected output signals for the other channels 1 and 2, as sampled at every eighth minor frame (e.g., 100 ms). The SO8OTH1 and SO8OTH2 signals are subtracted from the SO8P signal by adders 424 and 426, respectively. Similarly, the SO8OTH1 and SO8OTH2 signals are subtracted from the selected output signal SO by adders 428 and 430, respectively. The absolute value of the results of such subtractions by the adders 424, 426, 428 and 430 is taken by absolute value circuits 434, 436, 438 and 440, respectively.

Comparator 441 compares the differences between other channel 1 (SO8OTH1) and the latest sample from the local channel with the difference between the other channel 1 and the previous 100 millisecond sample from the local channel. The comparator 441 outputs a signal that operates switch 446 to select the smaller of the two differences to thus exclude time skew induced differences. Likewise, comparator 442 compares the differences between the latest and previous samples from the local channel and the other channel 2 (SO8OTH2) to operate switch 452 to select the smaller of the two differences. The output signals from switches 446 and 452 are limited to not exceed the variable limit cross-channel equalization by limiters 448 and 454. The values from the limiters 448 and 454 are summed in an adder 450 to produce an equalization correction for the other channels. A divider circuit 456 generates a cross-channel equalization signal XCEQ80 by averaging the equalization corrections for the other channel 1 and the other channel 2.

To prevent equalizing time skew effects which can be very significant at the 100 msec sample rate, the outputs from adders 424, 426, 428 and 430 are input to a Y input of transfer of sign circuits 464, 466, 468 and 470, respectively. A constant value of 1 is input to an X input of the transfer of sign circuits 464, 466, 468 and 470. The transfer of sign circuits operate such that if the Y input signal has a positive value, then the X signal is output therefrom. Otherwise, if the Y signal input has a negative value, the negative value of the X input is output therefrom.

The outputs for the transfer of sign circuits 464 and 468, corresponding to the other channel 1, are input to a comparator 471, while the outputs from the transfer of signs circuits 466 and 470, for the other channel 2, are input to a comparator 472. If the two inputs to the comparators 471 and 472 are unequal, then the comparators output signals to OR gates 473 and 474, respectively. Fault signals for other channel 1 and other channel 2 (FOTH1 and FOTH2) are also input to the OR gates 473 and 474, respectively. The output from the OR gate 473 is provided to select switches 476 and 478, which causes the switches to change state and input a constant value of 0 to absolute value circuits 438 and 434, respectively. Similarly, the output of the OR gate 474 is provided to select switches 480 and 482, which in response thereto change state to provide a constant value of 0 to absolute value circuits 436 and 440, respectively.

If the comparisons with present and past values of the local samples are of opposite signs, and thus recognized as being unequal in comparators 471 and 472, then channel differences are less than the time skew effects so no equalization is needed. If the equalizations for other channel 1 and other channel 2 are of opposite signs, then the local channel is the midvalue channel and so it needs no equalization. If both differences are greater than the limit value VLXE and have opposite signs, then the outputs from the limiters 448 and 454 will cancel and no movement of the midvalue channel will occur. If the outputs from the limiters 448 and 454 are equal and have the same value, then the XCEQ80 signal will have the limit value of+or−the VLXE rate. With three channels operating, the equalization works to pull the two outside channels towards the midvalue channel until the channels are very close, then each channel tries to move between the other two channels until they all agree. If one of the channels is failed, then each local channel is pulled towards the other working channel until they agree.

Figure 19:
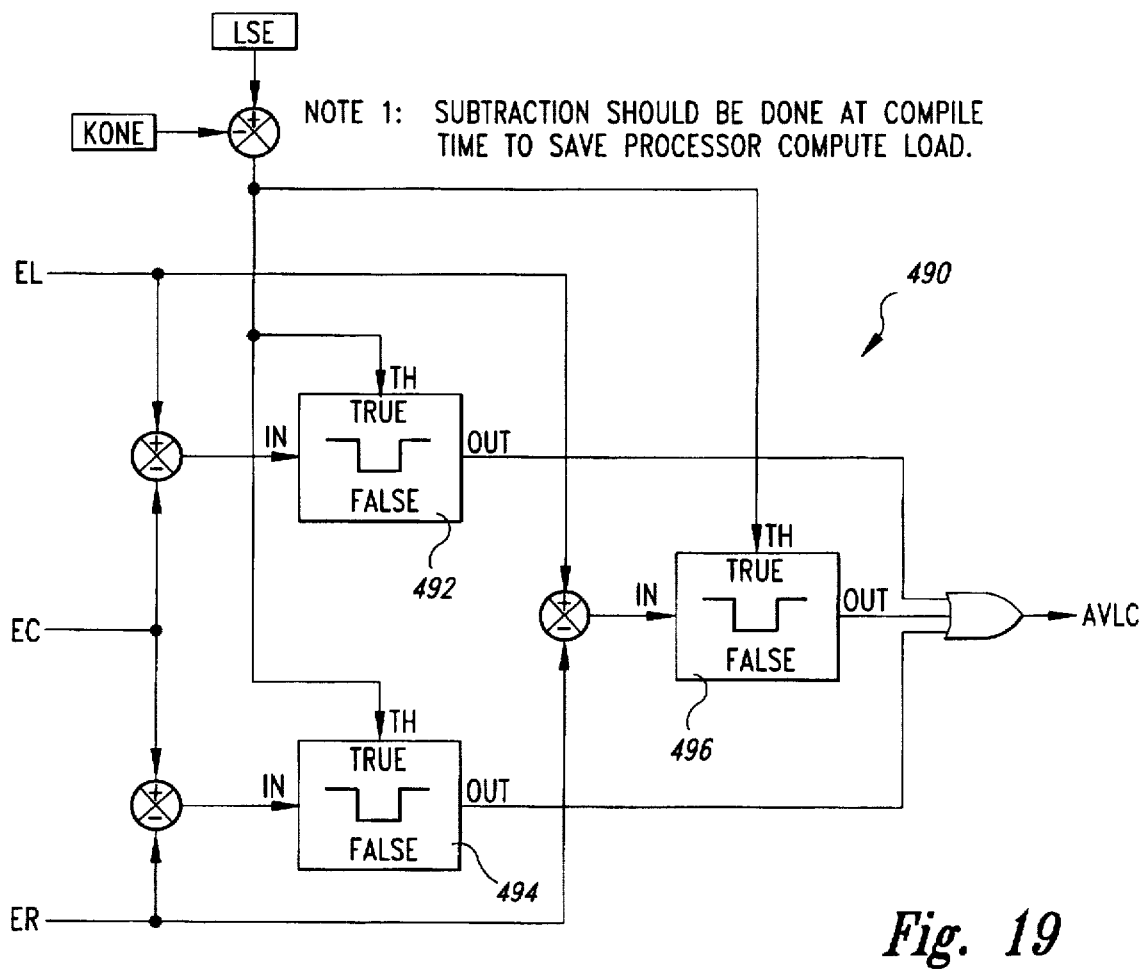
FIG. 19 is a schematic diagram of avalanche monitor circuitry for use in the system of FIG. 2.

Referring to FIG. 19, an avalanche monitor circuit 490 is shown which receives the equalization signals EL, EC and ER from the left, center and right channels. The equalization signals EL, EC and ER are added or subtracted from each other as shown in FIG. 19, and input into TRUE/FALSE circuits 492, 494 and 496. The TRUE/FALSE circuits 492, 494 and 496 are simple threshold circuit that output an avalanche condition signal AVLC (i.e. a TRUE value) if the input signal exceeds a threshold TH.

The threshold TH is set to the value of the static equalization limit LSE, minus 1, so that any signal equalizer 102, 104 or 106 that saturates to the LSE limit can hold the avalanche monitor circuit 490 continuously tripped (continuously outputting the AVLC signal). Under the avalanche monitor circuit 490, if any combination of two inputs have sufficient static spread, so that the midvalue input could fail, avalanche failure of all inputs can occur and the AVLC signal is output. The avalanche monitor circuit 490 as only applicable to three input operation. Avalanche monitoring or warning circuits are known to those skilled in the art.

Referring to FIG. 20, the SSFD system 100 of the present invention is shown in flowchart form to show the series of operations performed by the above-described circuits. As noted above, an alternate preferred embodiment of the present invention incorporates the above-described circuits into a software program, the software program being run on one or more computers. The flowchart of FIG. 20 is generally self-explanatory.

Figure 21:
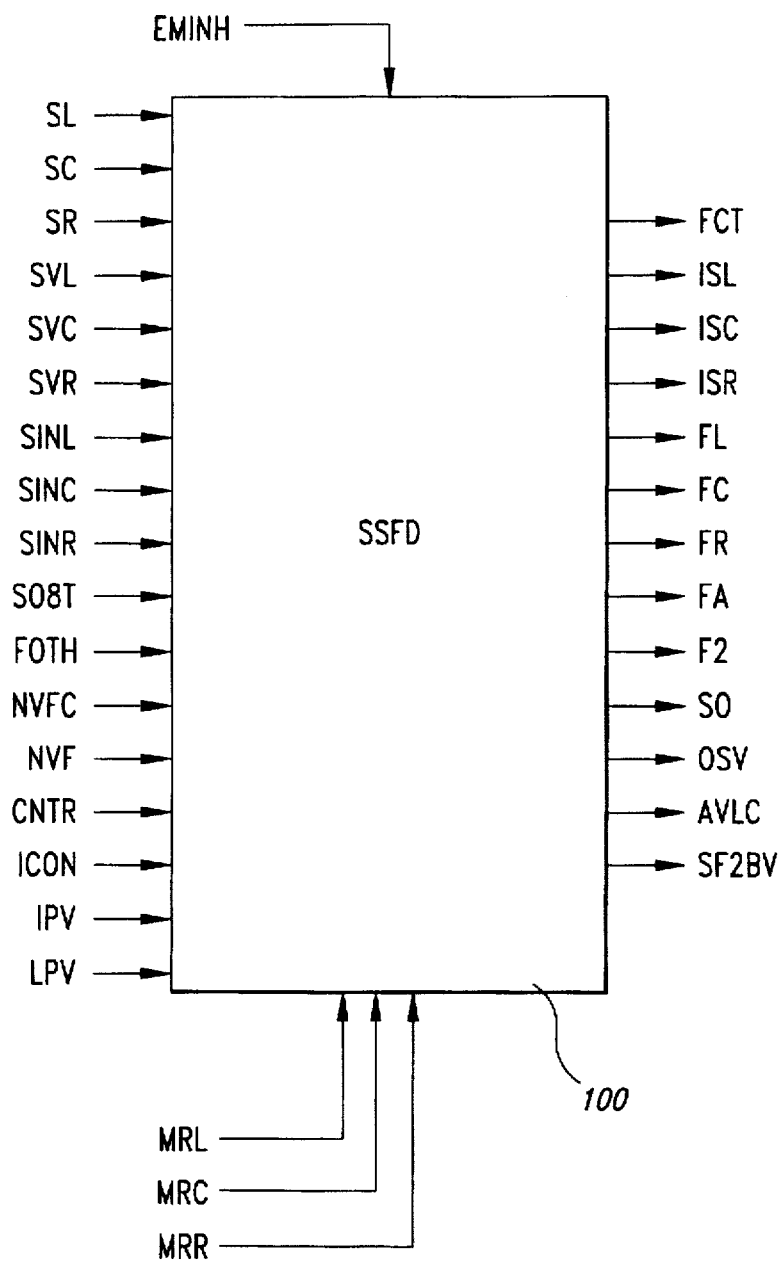
FIG. 21 is an icon of the system of FIG. 1 showing the input and output signals for the signal select and fault detect system of the present invention.

Referring to FIG. 21, the SSFD system 100 is shown as a single block having various input and output signals. FIG. 22 briefly describes the input and output signals of FIG. 21. FIGS. 21 and 22 show the input signals required for the SSFD system 100, and the signals that the system produces therefrom.

While the detailed description above has been expressed, in part, in terms of specific circuits, those skilled in the art will appreciate that many other variations of the circuits can be used to accomplish the purpose of the disclosed invention. Those skilled in the art will recognize that the above-described circuits of the present invention are readily adaptable for use in a software program to provide the same functionality of the circuits. Accordingly, it can be appreciated that various equivalent modifications of the above-described embodiments can be made without departing from the spirit and scope of the invention. Therefore, the present invention is limited only by the following claims.

We claim:

1. A signal selector apparatus for selecting one of at least two input information signals, the signals possibly having errors resulting from null offsets, rate induced differences and gain differences and noise, the apparatus comprising:

a signal selector module that receives and selects one of the at least two input signals as a selected information signal;

a rate calculating module coupled to receive the selected information signal and having a first limiter that receives and limits the selected information signal by a selected threshold amount to produce a rate generated tolerance component signal that represents a worst case rate induced tracking error of the input signals;

a gain error calculating module coupled to receive the selected information signal and having a first multiplier and a first subtractor, the first multiplier receiving the selected information signal and multiplying the selected information signal by a worst case gain tolerance constant to produce a gain tolerance component signal, and the first subtractor being coupled to the first multiplier and decreasing the gain tolerance component signal by a variable limit equalization rate to produce a gain generated tolerance component signal that represents a worst case gain induced offset of the input signals;

a first adder coupled to the rate calculating module and the gain error calculating module that adds the rate generated tolerance component signal and the gain generated tolerance component signal to produce a total tolerance component signal;

a retention filter coupled to the first adder that receives the total tolerance component signal and produces a delayed decay rate signal;

a first maximum select module coupled to the first adder and the retention filter, the first maximum select module receiving the total tolerance component signal and the delayed decay rate signal and outputting as a dynamic threshold component signal, wherein the dynamic component threshold signal is the greater of the total tolerance component and delayed decay rate signals;

a second adder coupled to the first maximum select module that adds a first constant value to the dynamic threshold component signal to produce a total threshold component signal;

a first comparator coupled to the second adder that outputs a zero value as an output signal if the total threshold component signal is greater than an absolute value of a dynamic tracking error of the selected information signal, outputs a decrement value as the output signal if the absolute value of the dynamic tracking error is less than the first constant value, and outputs the absolute value of the dynamic tracking error as the output signal if the absolute value of the error is greater than the total threshold component signal;

an integrator coupled to the comparator that integrates the output signal to produce an out-of-threshold integration signal; and a fault latching module coupled to the integrator and the signal selector module, the fault latching module receiving the out-of-threshold integration signal and latching the selected signal if the out-of-threshold integration signal exceeds a selected maximum value so that the signal selector module is prevented from selecting a latched signal.

2. The signal selector apparatus of claim 1, further comprising:

a second subtractor coupled to receive the dynamic threshold component signal that subtracts a low signal activity threshold from the dynamic threshold component signal to produce a subtracted dynamic threshold component signal;

a second multiplier coupled to the second subtractor that multiplies a second constant value by the subtracted threshold component signal to produce a first multiplied threshold component signal;

a second maximum select circuit coupled to the second multiplier that outputs the greater of a third constant value and the first multiplied threshold component signal as a variable limit rate;

a first divider circuit coupled to the second maximum select circuit that divides the variable limit rate by a fourth constant value to produce a divided variable limit rate signal;

a third maximum select circuit coupled to the first divider circuit that outputs the greater of the divided variable limit rate signal and a fifth constant value to produce a variable equalization rate for drift correction;

a third multiplier coupled to the third maximum select circuit that multiplies the variable equalization rate for drift correction by a sixth constant value to produce a variable limit cross channel equalization rate; and at least two equalization circuits coupled to the second maximum select circuit, the third maximum select circuit and the third multiplier, the equalization circuits each equalizing one of the input information signals based on the variable limit rate, the variable equalization rate for drift correction and the variable limit cross channel equalization rate.

3. The signal selector apparatus of claim 2 wherein a local channel has the selected information signal and an other channel has another selected information signal, the apparatus further comprising:

a third subtractor coupled to the signal selector module that subtracts the another selected information signal of the other channel from the selected signal of the local channel to produce a first subtracted cross channel signal;

a fourth subtractor that subtracts the another selected information signal of the other channel from a prior value of the selected signal of the local channel to produce a second subtracted cross channel signal;

a second comparator coupled to the third and fourth subtractors, the second comparator receiving the first and second subtracted cross channel signals and producing a switch signal therefrom;

a switch coupled to the second comparator that provides one of the first and second subtracted cross channel signals based on the switch signal;

a second limiter coupled to the switch and the equalization circuits, the second limiter limiting the one of the first and second subtracted cross channel signals based on the variable limit cross channel equalization rate to produce a cross channel equalization signal; and wherein the at least two equalization circuits provide equalization between the input information signals based on the cross channel equalization signal and the variable limit cross channel equalization signal.

\* \* \* \* \*